United States Patent Office 3,328,431
Patented June 27, 1967

3,328,431
6α - MONOFLUOROMETHYL, 6α-DIFLUOROMETH-
YL AND 6α - TRIFLUOROMETHYL PROGESTA-
TIONAL HORMONE DERIVATIVES
Albert Bowers and John Edwards, Mexico City, Mexico,
assignors, by mesne assignments, to Syntex Corporation,
a corporation of Panama
No Drawing. Filed Nov. 10, 1960, Ser. No. 68,376
34 Claims. (Cl. 260—397.3)

The present invention relates to novel cyclopentano-phenanthrene compounds and to a novel process for the production thereof.

More particularly the present invention relates to novel 6α - monofluoromethyl, 6α - difluoromethyl and 6α - trifluoromethyl progestational hormone derivatives and more specifically to derivatives of $\Delta^4$-pregnene-3,20-dione which may also contain a hydroxy or acyloxy group at C–17α and/or C–21, a methyl group in α or β-steric configuration at C–16, the 19-nor derivatives, and further unsaturation at C–1, 2, and/or C–6, 7.

The novel compounds of the present invention which are potent progestational agents as well as valuable intermediates for the preparation of 6α-monofluoromethyl and 6α-polyfluoromethyl cortical hormones are represented by the following formulas:

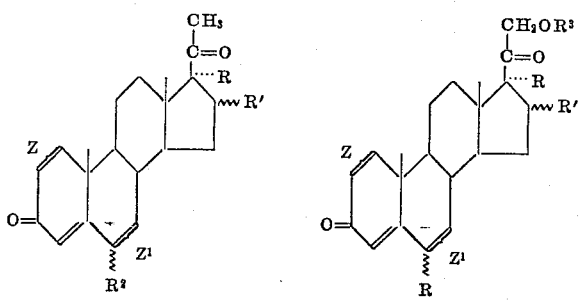

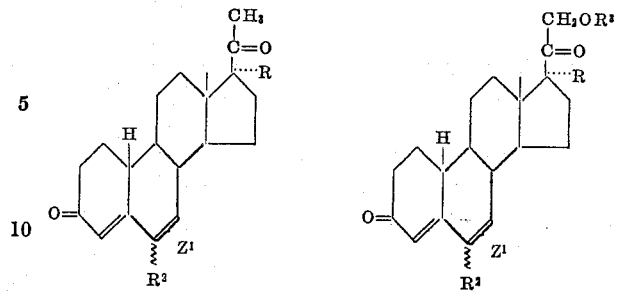

In the above formulas, R represents hydrogen, hydroxy or a hydrocarbon carboxylic acyloxy group containing less than 12 carbon atoms; R' represents hydrogen, α-methyl or β-methyl; $R^2$ represents a monofluoromethyl, difluoromethyl or trifluoromethyl group; $R^3$ represents hydrogen or a hydrocarbon carboxylic acyl group; and Z and Z' indicate a double bond between C–1 and C–2 and between C–6 and C–7 respectively.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimehylacetate, t-butylacetate, phenoxyacetate, cyclopentylpropionate, aminoacetate and β-chloropropionate.

The novel compounds of the present invention in which R is acyloxy have high oral progestational activity; the 6α-trifluoromethyl derivatives of 17α-acyloxyprogesterone and the 1-dehydro and 6-dehydro derivatives thereof particularly, are powerful oral progestational agents as well as exhibit bactericidal and fungicidal activities. The 1-dehydro and 6-dehydro compounds of the present invention in which $R^2$ represents the trifluoromethyl group also depress the central nervous system.

The novel compounds of the present invention having a hydroxy or acyloxy group at C–17 and at C–21 may be prepared by a process illustrated by the following equation:

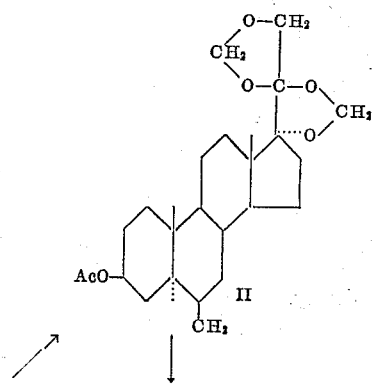

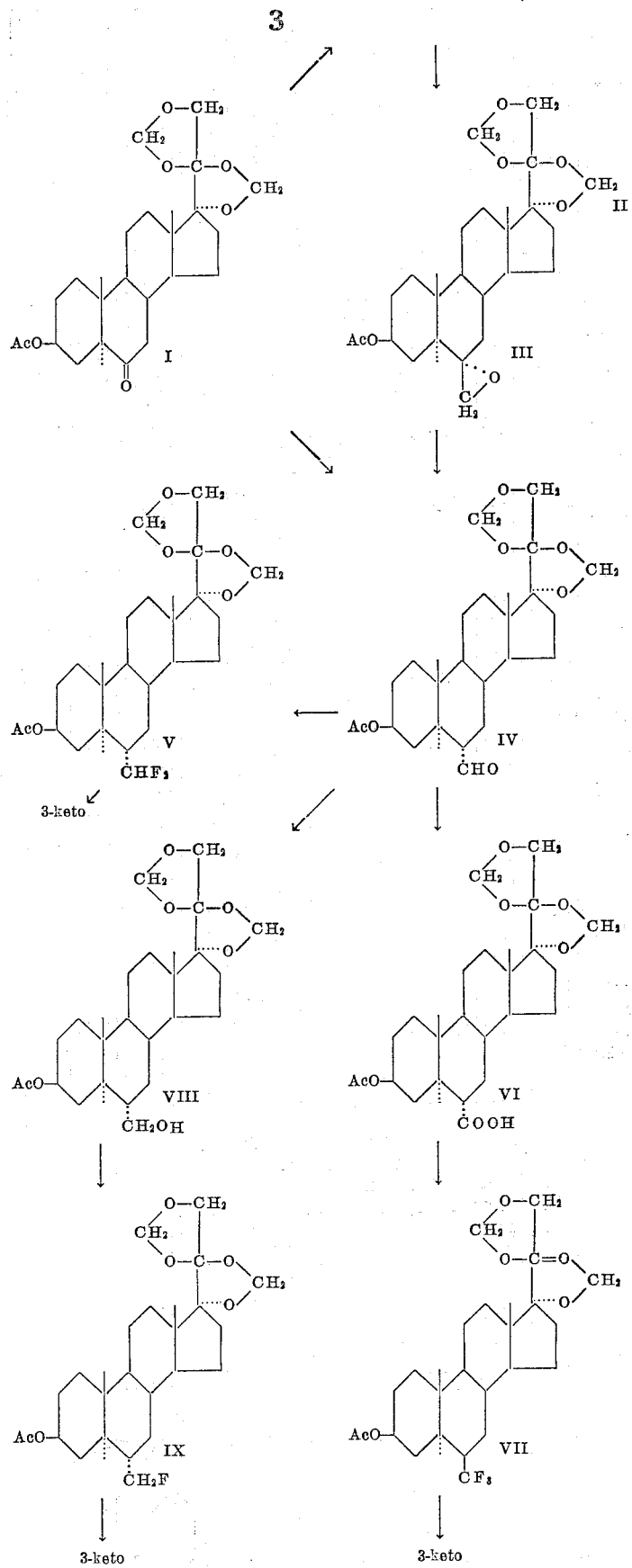

In the above formulas Ac represents the acyl group of a hydrocarbon carboxylic acid of the type mentioned previously.

In practicing the process outlined above, the starting material 17,20;20,21-bis-methylenedioxy - 3β - acyloxy-6- keto-allopregnane (I) is prepared by first protecting the dihydroxyacetone side chain of Δ⁵-pregnene-3β,17α,21-triol-20-one by formation of the bis-methylenedioxy derivative as by reaction with formaldehyde in chloroform solution in the presence of concentrated hydrochloric acid, followed by acetylation of the 3β-hydroxyl group. For introduction of the keto group at C-6, the latter compound is treated with a current of diborane in a solvent such as tetrahydrofuran. Upon subsequent reaction with alkaline hydrogen peroxide there is formed the 6α-hydroxy compound which is converted into the 6-keto compound (I) upon reaction with chromic oxide in pyridine.

Alternatively the 6-keto - 3β - acyloxy-17,20;20,21-bis-methylenedioxy-allopregnane (I) can be prepared by protecting the dihydroxyacetone side chain of a Δ⁴-pregnene-17α,21-diol-3,20-dione by forming the 17,20;20,21-bis-methylenedioxy derivative as described above, refluxing the latter with acetic anhydride and acetyl chloride under an atmosphere of nitrogen to form the 3-enol acetate. Upon subjecting the thus formed 3β-acetoxy-17,20; 20,21 - bismethylenedioxy-Δ³,⁵-pregnadiene to reduction with sodium borohydride in tetrahydrofuran-ethanol solution at 0° C. for four hours, followed by reacetylation, there is formed the 3β-acetoxy-17,20;20,21-bis-methylenedioxy-Δ⁵-pregnene. To a solution of the latter compound in dioxane containing a catalytic amount of perchloric acid, there is added N-bromoacetamide to form 3β-acyloxy-5α-bromo-6β-hydroxy-17,20;20,21-bis - methylenedioxy-pregnane which upon oxidation with chromic oxide in acetone is converted into the corresponding 6-keto derivative. Reductive debromination as by treatment with zinc and acetic acid of the latter compound yields the starting material 17,20;20,21-bis-methylenedioxy-3β-acyloxy-6-keto-allopregnane (I).

By adding the thus prepared 17,20;20,21-bis-methylenedioxy-3β-acyloxy-6-keto-allopregnane (I) to a mixture of triphenylphosphonium methyl bromide and butyl lithium in ether solution under an atmosphere of nitrogen, there is afforded the 17,20;20,21-bis-methylenedioxy-6-methylene-allopregnane (II) which upon treatment with a peracid such as monoperphthalic or perbenzoic acid at room temperature for about 17-18 hours in a solvent such as ether or chloroform is transformed into the corresponding oxide (III). Upon treatment of the latter compound with boron trifluoride-ether complex for a period of time of the order of three hours at 20° C. in benzene solution, there is formed 17,20;20,21-bis-methylenedioxy-3β-acyloxy-6α-aldehydo-allopregnane (IV). Alternatively, the aldehyde can be prepared directly from the 6-keto compound (I) by adding the latter to a mixture of triphenyl (methoxymethyl) phosphonium chloride and butyl lithium in ether, followed by the treatment with perchloric acid to afford the 6α-carboxaldehyde (IV). Upon reaction of the aldehyde with 2 equivalents of sulfur tetrafluoride in dioxane for about 48 hours at 20° C., there is formed the corresponding 6α-difluoromethyl derivative (V), which upon hydrolysis with dilute methanolic potassium hydroxide followed by oxidation with chromic acid of the thus formed 6α-difluoromethyl-17,20;20,21-bis-methylenedioxy-allopregnan-3β-ol produces the corresponding 3-keto derivative.

Alternatively, the 17,20;20,21-bis-methylenedioxy-3β-acyloxy-6α-aldehydo-allopregnane (IV) is reduced with lithium aluminum tri-tertiary butoxy hydride to form the corresponding 6α-hydroxymethyl derivative (VIII) which is converted into the corresponding mesylate upon reaction with mesyl chloride and pyridine. Upon treatment of the latter compound with potassium fluoride in a solvent such as dimethylformamide there is obtained 3β-acyloxy-6α-monofluoromethyl - 17,20;20,21 - bis-methylenedioxy-allopregnane (IX) which is hydrolyzed and oxidized in the same manner as described above for the 6α-difluoromethyl derivative to form the corresponding 6α-monofluoromethyl-17,20;20,21-bis - methylenedioxy - allopregnan-3-one.

Upon oxidation of the 17,20;20,21-bis-methylenedioxy-3β-acyloxy-allopregnane-6α-carboxaldehyde (IV) with 8 N chromic acid, there is formed the corresponding 6α-carboxy compound (IV) which upon reaction with 2 equivalents of sulfur tetrafluoride in dioxane solution for 2 days at 20° C. is converted into the corresponding 6α-trifluoromethyl derivative (VII). Hydrolysis of the ester group followed by oxidation of the free 3β-hydroxy group with chromic acid affords 6α-trifluoromethyl-17,20; 20,21-bis-methylenedioxy-allopregnan-3-one.

The 6α-monofluoromethyl derivative can also be prepared from the 6-methylene compound (II) by a process illustrated by the following equation:

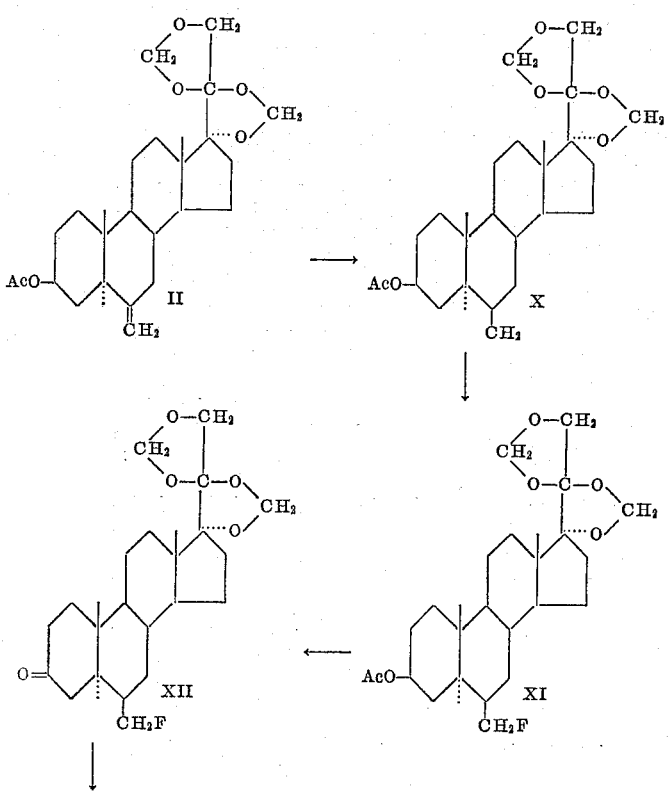

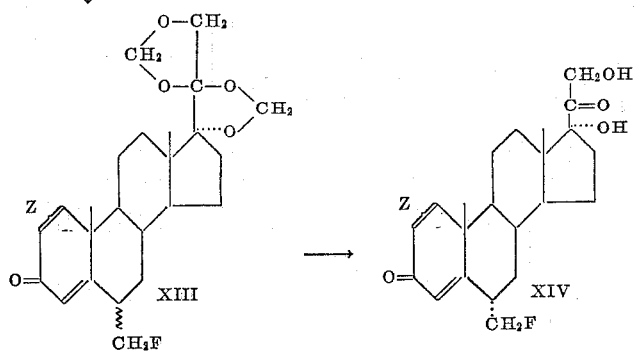

In the above formulas Z has the same meaning as previously set forth and Ac represents the acyl group of a hydrocarbon carboxylic acid of the type mentioned previously.

In practicing the process outlined above, 6-methylene-17,20;20,21 - bis - methylenedioxy-allopregnan-3β-ol-acylate (II) is treated with a current of diborane and aqueous alkaline peroxide to form the 6β-hydroxymethyl derivative (X) which is converted into the 6β-monofluoromethyl derivative (XI) upon reaction with mesyl chloride and pyridine followed by reaction with potassium fluoride in dimethylformamide. Upon mild hydrolysis of the acyloxy group followed by oxidation of the resulting 3β-hydroxy group with chromic acid in acetone there is formed 6β-monofluoromethyl-17,20;20,21-bis-methylenedioxy-allopregnan-3-one (XII). A double bond can then be introduced at C–4,5 and/or at C–1,2 by conventional methods. Thus by dibromination at C–2 and C–4 followed by dehydrobromination as for example by reaction with calcium carbonate in dimethylformamide, there is obtained 6β-monofluoromethyl-17,20;20,21-bis-methylenedioxy-$\Delta^{1,4}$-pregnadien-3-one (XIII: Z=double bond) which upon treatment with methanolic potassium hydroxide results in inversion of the steric configuration at C–6 to afford the 6α-monofluoromethyl compound (XIII: Z=double bond). The bis-methylenedioxy group is removed by hydrolysis as by heating with dilute formic acid to yield the novel 6α-monofluoromethyl-$\Delta^{1,4}$-pregnadiene-17α,21-diol-3,20-dione (XIV: Z=double bond).

Alternatively, by dibromination of 6β-monofluoromethyl-17,20;20,21-bis-methylenedioxy - allopregnane-3-one (XII) at C–2 and C–4 followed by heating with an alkali metal iodide there is formed the 2-iodo-$\Delta^4$-3-keto derivative which is subsequently deiodinated by refluxing with a tertiary amine such as collidine to afford 6α-monofluoromethyl-17,20;20,21 - bis - methylenedioxy-$\Delta^4$-pregnen-3-one (XIII: Z=saturated linkage). In a similar manner as set forth above, the dihydroacetone side chain at C–17 is regenerated upon hydrolysis of the bismethylenedioxy group with dilute formic acid to form 6α-monofluoromethyl-$\Delta^4$-pregnene-17α,21-diol-3,20-dione (XIV: Z=saturated linkage).

In a similar manner the 6α-difluoromethyl and 6α-trifluoromethyl derivatives of 17,20;20,21-bis-methylenedioxy-allopregnan-3-one (described above) are converted into the novel 6α-difluoromethyl-$\Delta^{1,4}$-pregnadiene-17α,21-diol-3,20-dione, 6α-difluoromethyl - $\Delta^4$-pregnene-17α,21-diol-3,20-dione, 6α - trifluoromethyl - $\Delta^{1,4}$-pregnadiene-17α,21-diol-3,20-dione and 6α - trifluoromethyl-$\Delta^4$-pregnene-17α,21-diol-3,20-dione by the methods of dibromination, dehydrohalogenation and hydrolysis described above.

For introduction of a double bond at C–6,7, the 6α-monofluoromethyl or 6α-polyfluoromethyl derivatives of $\Delta^4$-pregnene-17α,21-diol-3,20-dione or of $\Delta^{1,4}$-pregnadiene-17α,21-diol-3,20-dione are refluxed with chloranil in a solvent such as tertiary butyl alcohol or tertiary amyl alcohol for a period of time of the order of 18 hours to form the corresponding 6-monofluoromethyl or 6-polyfluoromethyl derivatives of $\Delta^{4,6}$-pregnadiene-17α,21-diol-3,20-dione or of $\Delta^{1,4,6}$-pregnatriene-17α,21-diol-3,20-dione.

Conventional esterification of the free alcohol with hydrocarbon carboxylic acid anhydrides of less than 12 carbon atoms affords the C–21 esters thereof. Esterification of the tertiary hydroxyl group at C–17α is effected with hydrocarbon carboxylic acid anhydrides in benzene solution in the presence of p-toluenesulfonic acid. Thus, diesters are formed containing the same or different ester groups depending upon the acid anhydride that is employed.

The novel compounds of the present invention having a methyl group at C–16 and a monofluoromethyl or polyfluoromethyl group at C–6α are prepared in the same manner as the compounds unsubstituted at C–16 except that 16(α or β)-methyl-$\Delta^5$-pregnene-3β,17α,21-triol-20-one-3-benzoate are employed as the starting materials. The latter compounds are prepared by conventional methods involving adding a molar equivalent of chlorine to a chloroform solution of 16(α or β)-methyl-$\Delta^5$-pregnen-3β-ol-20-one acetate to protect the $\Delta^5$-double bond, introducing a hydroxyl group at C–17α by the procedure of Kritchevsky and Gallagher, J. Am. Chem. Soc. 74, 483 (1952) and then reductively dechlorinating the thus formed 5α,6β-dichloro-16(α or β)-methyl-$\Delta^5$-pregnene-3β,17α-diol-20-one as by treatment with zinc and acetic acid to form 16(α or β)-methyl-17α-hydroxy-$\Delta^5$-pregnen-3β-ol-20-one. There is then introduced an acetoxy group at C–21 by the method of Stork et al., supra, to form 16(α or β)-methyl-$\Delta^5$-pregnen-3β,17α,21-triol-20-one 21-acetate which upon reaction with benzoyl chloride in pyridine results in the formation of 16(α or β)-methyl-$\Delta^5$-pregnen-3β,17α,21-triol - 20-one-3-benzoate 21-acetate. Saponification of the 21-acetate group in the presence of the 3-benzoate group is accomplished by conventional treatment with dilute methanolic potassium hydroxide at 0° C. under an atmosphere of nitrogen.

By subjecting the thus formed 16(α or β)-methyl-$\Delta^5$-pregnene-3β,17α,21-triol-20-one-3β-benzoate to the methods applied to the C–16 unsubstituted compounds, there is formed the corresponding 16α and 16β-methyl derivatives of 6α-monofluoromethyl-$\Delta^4$ - pregnene-17α,21-diol-3,20-dione, of 6α-difluoromethyl-$\Delta^4$-pregnene-17α,21-diol-3,20-dione, of 6α-trifluoromethyl-$\Delta^4$ - pregnene-17α,21-diol-3,20-dione, of the 1-dehydro, 6-dehydro derivatives and the esters thereof with hydrocarbon carboxylic acid anhydrides of less than 12 carbon atoms.

The novel 21-desoxy compounds of the present invention are prepared from the above described 21-hydroxy compounds by a process illustrated by the following equation:

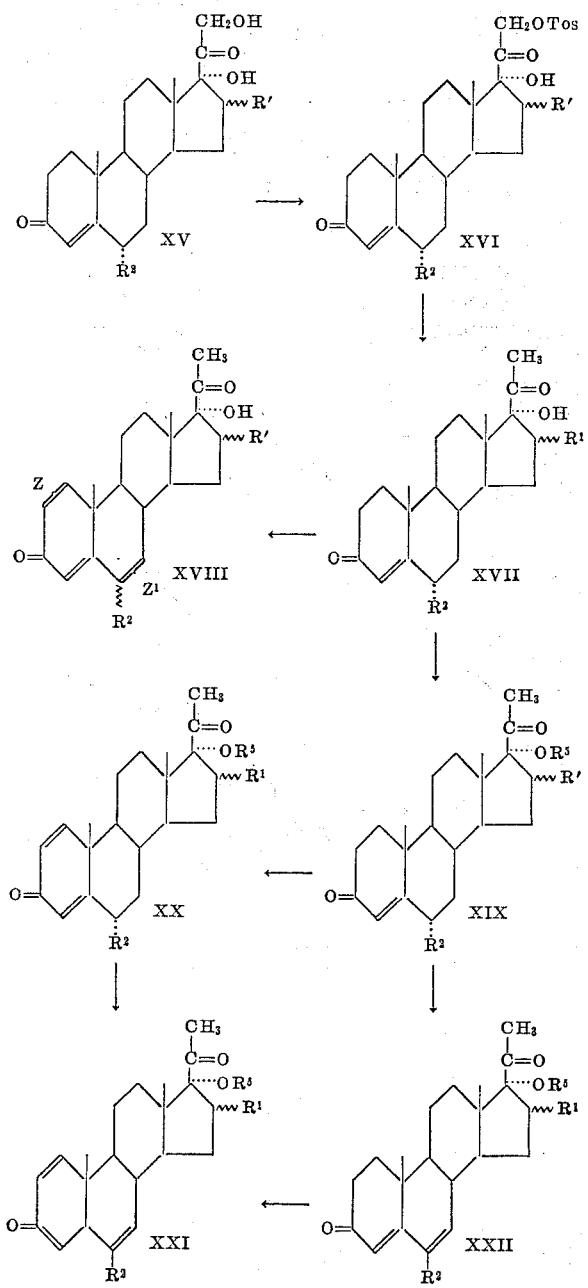

In the above formulas, Tos represents the tosylate radical, $R^5$ represents a hydrocarbon carboxylic acyl group of the type previously mentioned; and R', $R^2$, Z and Z' have the same meaning as heretofore set forth.

In practicing the process outlined above, a 6α-monofluoromethyl or 6α-polyfluoromethyl-Δ⁴-pregnene-17α,21-diol-3,20-dione, with or without a methyl substituent at C–16 (XV) is reacted with p-toluenesulfonic acid chloride in pyridine solution at 0° C. for 16 hours to form the 21-tosylate (XVI), which upon refluxing with an alkali metal iodide, such as sodium iodide, and acetic acid for 1 to 2 hours, is converted into the 21-desoxy derivative (XVII). Esterification of the tertiary hydroxyl group at C–17α is then effected as described previously with hydrocarbon carboxylic acid anhydrides in benzene solution in the presence of p-toluenesulfonic acid to form the esters of 6α-monofluoromethyl or 6α-polyfluoromethyl-Δ⁴-pregnen-17α-ol-3,20-dione, or, of the 16-methyl derivatives thereof (XIX). Dehydrogenation at C–1,2 is carried out by refluxing the latter compounds with 2,3-dichloro-5,6-dicyano-1,4-benzoquinone in dioxane solution for 24 hours to thus form the corresponding 1-dehydro derivatives (XX). For introduction of a double bond at C–6,7 the latter compounds are refluxed with chloranil in a solvent such as tertiary butanol for 24 hours to thus form the 6-monofluoromethyl or 6-polyfluoromethyl-Δ¹,⁴,⁶-pregnatrien-17α-ol-3,20-dione-acylate (XXI). Alternatively the latter compound can be formed from the Δ⁴ compounds (XIX) by first refluxing the Δ⁴ compounds with chloranil as described above to form the Δ⁴,⁶ compounds (XXII) and then employ the method of dehydrogenation with 2,3-dichloro-5,6-dicyano-1,4-benzoquinone to introduce the double bond at C–1,2 to thus form the Δ¹,⁴,⁶-compounds (XXI).

In a similar manner the free 6α-monofluoromethyl or 6α - polyfluoromethyl - Δ⁴ - pregnen-17α-ol-3,20 - diones (XVII) can be dehydrogenated at C–1,2 and/or at C–6,7 to form the corresponding 1-dehydro, 6-dehydro and 1,6-bis-dehydro compounds (XVIII).

In another aspect of the present invention the novel monofluoromethyl and trifluoromethyl derivatives of the present invention can be prepared by a process illustrated by the following equation:

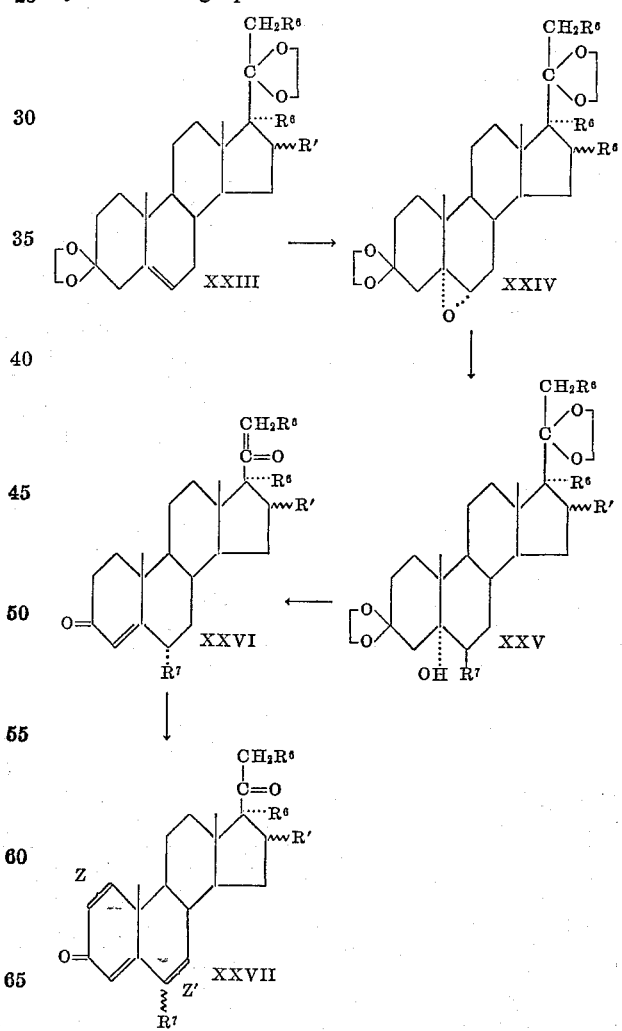

In the above formulas $R^6$ represents hydrogen or hydroxy; $R^7$ represents monofluoromethyl or trifluoromethyl; R', Z and Z' have the same meaning as previously set forth.

In practicing the process outlined above, the keto groups of progesterone, 17α-hydroxy-progesterone, desoxycorticosterone, Reichstein's Compound "S," the 16-methyl derivatives or the 19-nor derivatives thereof are protected by formation of the cyclic alkylene ketals as by refluxing with an alkylene glycol, preferably ethylene glycol, in benzene solution, in the presence of p-toluenesulfonic acid to form the starting compound (XXIII) which is then epoxidized as by reaction with monoperphthalic or perbenzoic acid to form the 5α,6α-epoxide (XXIV). A monofluoromethyl or trifluoromethyl moiety is then introduced by reacting the latter compound with a monofluoromethyl or trifluoromethyl magnesium halide, preferably the iodide, in a solvent such as tetrahydrofuran at a temperature in the order of —15° C. to 0° C. to open the epoxide ring to form the 5α-hydroxy-6β-monofluoromethyl or 5α - hydroxy - 6β-trifluoromethyl compound (XXV). Upon reaction with concentrated hydrochloric acid and acetic acid at 15° C. for 2 hours, hydrolysis of the ketal groupings and dehydration at C-5α are effected with simultaneous inversion of the steric configuration at C-6 to form the 6α-monofluoromethyl- or 6α-polyfluoromethyl-Δ⁴-3,20-diones (XXVI).

Dehydrogenation at C-1,2 is effected by refluxing the latter compounds with selenium dioxide or 2,3-dichloro-5,6-dicyano-1,4-benzoquinone as previously described to form compounds XXVII (Z=double bond; Z'=saturated linkage) which can be further dehydrogenated at C-6,7 as by treatment with chloranil in the manner heretofore described to yield the 1,6-bis-dehydro compounds (XXVII: Z=Z'=double bond). Alternately the dehydrogenation at C-6,7 may be effected prior to the dehydrogenation at C-1,2 to yield the 6-dehydro compounds (XXVII: Z=saturated linkage; Z'=double bond).

The 19-nor derivatives are formed in the same manner except that dehydrogenation at C-1,2 is not carried out.

Conventional esterification with hydrocarbon carboxylic acid anhydride results in C-21-esters of the C-21 alcohols. Esterification of the tertiary hydroxyl group at C-17α is effected with the acid anhydride or acid chlorides in benzene solution in the presence of p-toluenesulfonic acid. The formation of the C-21-esters, C-17-esters or C-17,21-diesters can be effected prior or subsequent to the dehydrogenation at C-1,2 and/or C-6,7.

The above described compounds can also be prepared from 3β-acyloxy-Δ⁵-pregnene-17α,21-diol-20-one as illustrated by the following equation:

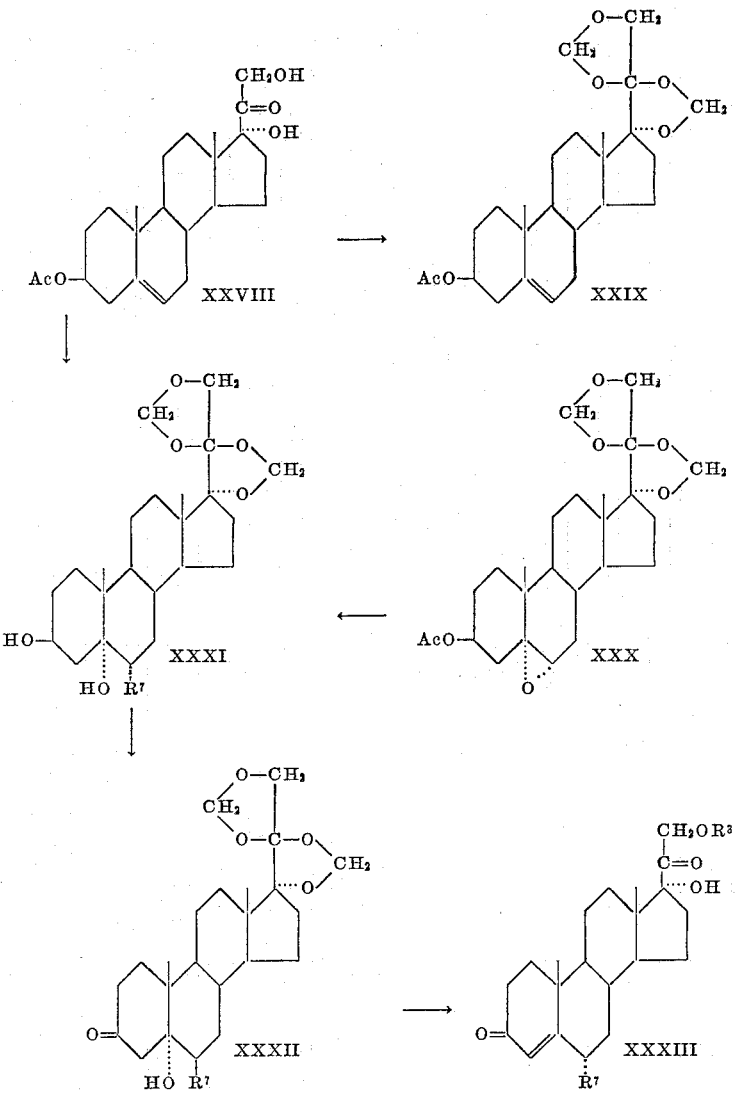

In the above formulas, Ac, R³ and R⁷ have the same meaning as previously set forth.

In practicing the process outlined above the dihydroxyacetone side chain of 3β-acyloxy-Δ⁵-pregnene-17α,21-diol-20-one (XXVIII) is protected by formation of the bis-methylenedioxy derivative as described heretofore to form the 17,20;20,21 bis-methylenedioxy-3β-acyloxy-Δ⁵-pregnene (XXIX). The latter is then epoxidized as by reaction with a monoperphthalic or perbenzoic acid to form the 5α,6α-epoxide (XXX). A monofluoromethyl or trifluoromethyl moiety is then introduced by reacting the latter compound with a monofluoromethyl or trifluoromethyl magnesium halide, preferably the iodide, in a solvent such as tetrahydrofuran, diethylether, dioxane or anisole, at a temperature in the order of —30° C. to 20° C., preferably at about —20° C., to open the epoxide ring to form with simultaneous hydrolysis of the acetoxy group, the corresponding 3β,5α-dihydroxy-6β-monofluoromethyl or 3β,5α-dihydroxy-6β-trifluoromethyl compound (XXI). Upon oxidation of the latter compound with chromic acid there is formed the 17,20;20,21-bismethylenedioxy-6β-monofluoromethyl or 6β-polyfluoromethyl-pregnan-5α-ol-3-one (XXXII). Upon treatment of the latter compound with methanolic potassium hydroxide or hydrogen chloride in acetic acid, dehydration at C-5 with simultaneous inversion of the steric configuration at C-6 is effected to yield 17,20;20,21-bismethylenedioxy-6α-monofluoromethyl or 6α-polyfluoromethyl-Δ⁴-pregnen-3-one. Upon removal of the bis-methylenedioxy grouping by hydrolysis with dilute formic acid there is obtained 6α-monofluoromethyl or 6α-polyfluoromethyl-Δ⁴-pregnene-17α,21-diol-3,20-dione (XXXIII: R³=hydrogen). Conventional esterification with hydrocarbon carboxylic acid anhydrides of the type set forth heretofore yields the corresponding C-21 esters (XXXIII: R³=acyl), while esterification of the tertiary hydroxyl group can be effected as described previously. By applying the methods of dehydrogenation at C-1,2 and/or C-6,7 and the method of desoxylation at C-21 as previously described there are formed the 1-dehydro, 6-dehydro or 1,6-bisdehydro derivatives of compound XXXIII as well as the corresponding C-21 desoxy compounds.

The novel 6α-monofluoromethyl compounds of the present invention can also be prepared by a process illustrated by the following equation:

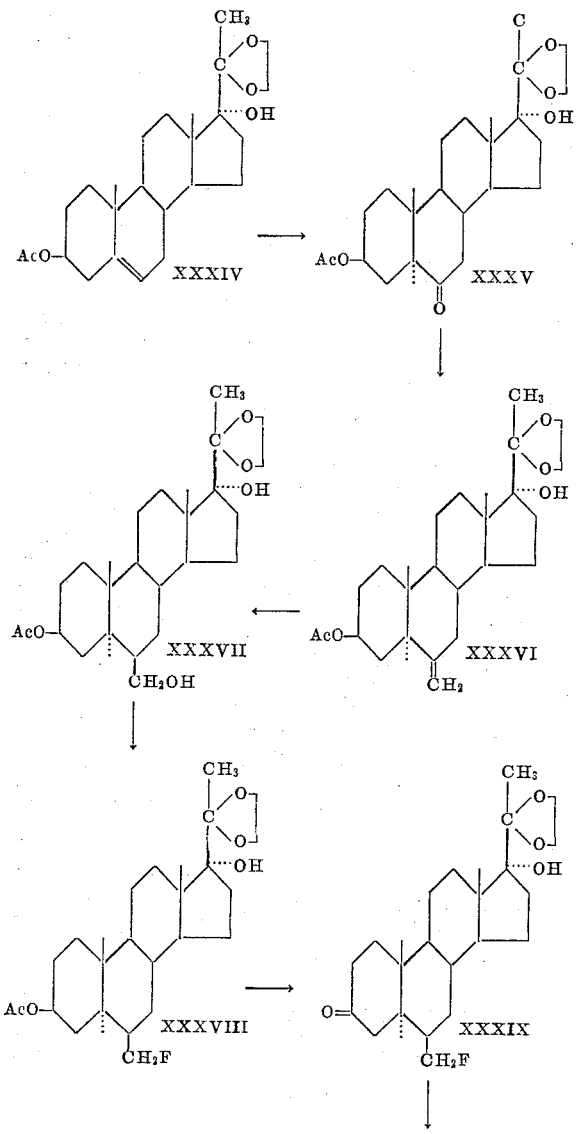

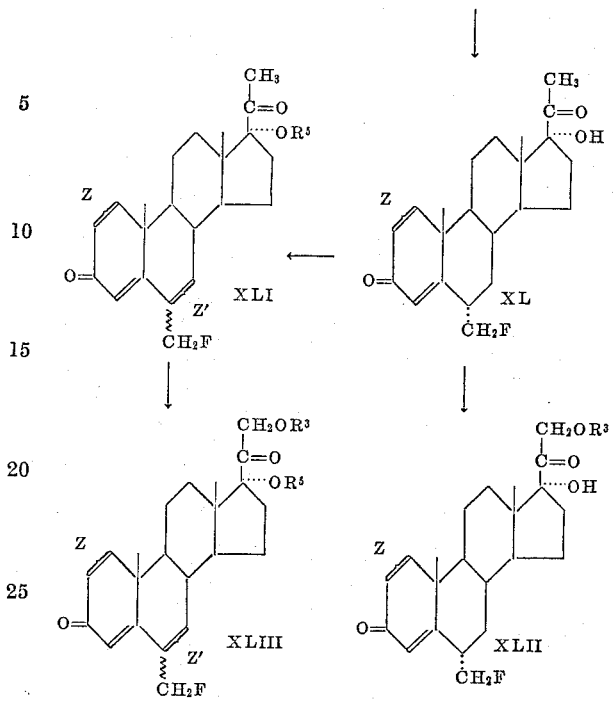

In the above formulas Ac, R³, R⁵, Z and Z' have the same meaning as previously set forth.

In practicing the process outlined above, the keto group of 3β-acyloxy-17α-hydroxy-Δ⁵-pregnen-20-one, preferably the 3-benzoyloxy, is protected by formation of the cyclic alkylene ketal thereof (XXXIV). By following the methods previously described a keto group is introduced at C-6 (XXXV), which is then converted stepwise into the methylene group (XXXVI), the methylol group (XXXVII) and finally the monofluoromethyl group (XXXVIII). Upon mild hydrolysis of the acyloxy group at C-3, with inversion of the steric configuration at C-6, followed by oxidation of the resulting 3β-hydroxy group with chromic acid in acetone, there is formed 6α-monofluoromethyl-20-ethylenedioxy-allopregnan-17α-ol-3-one (XXXIX). A double bond can then be introduced at C-4,5 and at C-1,2 by the methods of dehydrogenation previously described to thus form the 20-cyclic ketal of 6α-monofluoromethyl-Δ⁴-pregnen-17α-ol-3,20-dione and of 6α-monofluoromethyl-Δ¹,⁴-pregnadien-17α-ol-3,20-dione. Removal of the ketal group at C-20 by reaction with hydrochloric acid and acetone affords the 6α-monofluoromethyl-Δ⁴-pregnen-17α-ol-3,20-dione or 6α-monofluoromethyl-Δ¹,⁴-pregnadien-17α-ol-3,20-dione (XL). Upon reaction of the latter compounds with a hydrocarbon carboxylic acid anhydride of less than 12 carbon atoms in benzene solution and in the presence of p-toluenesulfonic acid, there are formed the corresponding esters (XLI: Z'=saturated linkage) which can further be dehydrogenated at C-6,7 upon treatment with chloranil to produce the esters of 6-monofluoromethyl-Δ⁴,⁶-pregnadien-17α-ol-3,20-dione and of 6-monofluoromethyl-Δ¹,⁴,⁶-pregnatrien-17α-ol-3,20-dione (XLI: Z'=double bond).

By monoiodination at C-21 of the 6α-monofluoromethyl-Δ⁴-pregnen-17α-ol-3,20-dione (XL: Z=saturated linkage or of the 1-dehydro derivatives thereof (XL: Z=double bond) as by reaction with an excess of iodine in the presence of a base such as solid calcium oxide in mixture with tetrahydrofuran and methanol as described by Stork et al., U.S. Patent 2,874,154, followed by reflux of the thus formed 21-iodo compound with sodium acetate or potassium acetate in mixture with acetone, there is introduced an acetoxy group at C-21 to thus form 6α-monofluoromethyl-Δ⁴-pregnene-17α,21-diol-3,20-dione 21-acetate (XLII: Z=saturated linkage) or 6α- monofluoromethyl - Δ$^{1,4}$ - pregnadiene - 17α,21 - diol - 3, 20-dione 21-acetate (XLII: Z=double bond). The ester group is saponified as by treatment with methanolic potassium hydroxide to form the free 17α-21-diol (XLII: R$^3$=hydrogen). By conventional esterification with other hydrocarbon carboxylic acid anhydrides of the type previously mentioned other C–21 esters are prepared.

In a similar manner, a hydroxyl group is introduced at C–21 of the esters of 6α-monofluoromethyl-Δ$^4$-pregnen-17α-ol-3,20-dione (XLI: Z=Z'=saturated linkage), of 6α - monofluoromethyl - Δ$^{1,4}$ - pregnadien - 17α - ol - 3, 20-dione (XLI: Z=double bond; Z'=saturated linkage), of 6-monofluoromethyl-Δ$^{4,6}$-pregnadien-17α-ol-3,20-dione (XLI: Z=saturated linkage; Z'=double bond) and of 6-monofluoromethyl - Δ$^{1,4,6}$ - pregnatrien - 17α-ol-3,20-dione (XLI: Z=Z'=double bond) to form the corresponding C–17,21-diesters (XLIII: R$^3$=acyl) and the C–21 alcohol thereof (XLIII: R$^3$=hydrogen).

By substituting in the above process the 3β-acyloxy-17α-hydroxy - Δ$^5$ - pregnen-20-one by 3β-acyloxy-Δ$^5$-pregnen-20-one, there is formed all of the corresponding compounds lacking the 17α-hydroxyl or 17α-acyloxy group.

Similarly the difluoromethyl and trifluoromethyl derivatives can be prepared by starting with 3β-acyloxy-6-keto - 20 - ethylenedioxy - 17α - hydroxy - allopregnane (XXXV). By following the methods described previously there is first formed the 6α-carboxaldehyde derivative which is then converted into the 3β-acyloxy-6α-difluoromethyl - 20 - ethylenedioxy - 17α-hydroxy-allopregnane or alternatively into the 3β-acyloxy-6α-carboxy-20-ethylenedioxy-17α-hydroxy-allopregnane and finally into the 3β-acyloxy - 6α - trifluoromethyl - 20 - ethylenedioxy - 17α-hydroxy-allopregnane. Removal of the acyloxy group at C–3 by mild hydrolysis, conversion of the 3β-hydroxy group to keto, introduction of double bonds at C–4,5, C–1,2 and/or at C–6,7, followed by removal of the ketal group results in the 6α-difluoromethyl and 6α-trifluoromethyl derivatives of Δ$^{1,4}$-pregnadien-17α-ol-3,20-dione and of Δ$^{1,4,6}$-pregnatrien-17α-ol-3,20-dione. Esterification of the tertiary hydroxyl group with hydrocarbon carboxylic acid anhydrides by the method described previously affords the corresponding 17α-esters.

A hydroxyl group can then be introduced by the method described heretofore to yield the 6α-difluoromethyl derivatives and the 6α-trifluoromethyl derivatives of Δ$^4$-pregnene-17α,21-diol-3,20-dione, of the 1-dihydro, 6-dihydro and 1,6-bis-dihydro derivatives as well as of the 17-esters, 21-esters and 17,21-diesters thereof with hydrocarbon carboxylic acid anhydrides.

By starting with 3β-acyloxy-Δ$^5$-pregnen-20-one which is converted into 3β-acyloxy-20-ethylenedioxy-6-keto-allopregnane and by following the procedure first described there is formed all of the corresponding 6α-difluoromethyl and 6α-trifluoromethyl derivatives lacking the hydroxy or acyloxy group at C–17α.

The following examples serve to illustrate but are not intended to limit the scope of the present invention:

*Example I*

A chloroform solution of 10 g. of Δ$^5$-pregnene-3β,17α,21-triol-20-one was converted into the corresponding 17,20;20,21-bis-methylenedioxy derivative, M.P. 237–239° C., by treatment with aqueous formaldehyde and concentrated hydrochloric acid at room temperature for 48 hours, in accordance with the method of Saret et al. in J. Am. Chem. Soc., 80, 1518 (1958). Acetylation of the above compound with acetic anhydride in pyridine solution gave 3β-acetoxy-17,20;20,21-bis-methylenedioxy Δ$^5$-pregnene, M.P. 171–173° C.

A slow stream of diborane was passed through a solution of the above compound in 125 cc. of tetrahydrofuran for 1 hour. (After 20 minutes the solution became warm and then the temperature slowly subsided.) The excess of diborane was decomposed by careful addition of water. Then 1 l. of water was added and the formed precipitate was filtered, washed and dried, thus giving 9.6 g. of the organoboron compound.

This material was dissolved in 200 cc. of tetrahydrofuran and treated with 9 g. of sodium hydroxide previously dissolved in 25 cc. of water, and 45 cc. of 35% hydrogen peroxide, stirring and keeping the temperature around 15° C. The mixture was stirred for 2 hours; after this time, the precipitated product was filtered, washed and dried, thus producing 6α - hydroxy-3β-acetoxy-17,20;20,21-bis-methylenedioxy-allopregnane.

A solution of 6 g. of the above compound in 120 cc. of pyridine was added to a mixture of 6 g. of chromium trioxide in 120 cc. of pyridine. The reaction mixture was kept at room temperature overnight. It was then diluted with ethyl acetate, filtered through celite and the filtrate washed well with water, dried and evaporated almost to dryness until crystallization started, there was thus obtained 6-keto-3β-acetoxy-17,20;20,21-bis-methylenedioxy-allopregnane, M.P. 179–180°.

A suspension of 14.5 g. of triphenylphosphonium methyl bromide in 250 cc. of anhydrous ether was treated, under an atmosphere of nitrogen, with 40 cc. of a 1 N ethereal solution of butyl lithium and the mixture was stirred for 2 hours at room temperature. A solution of 5 g. of the 6-keto steroid obtained in the previous experiment was then added dropwise in the course of 15 minutes and with stirring. The reaction mixture was stirred for 6 hours further and let stand at room temperature overnight. The ether was displaced with dry tetrahydrofuran by distillation and then refluxed for 8 hours. It was then cooled, diluted with water and extracted several times with ethyl acetate, the organic extract was washed with water, dried over anhydrous sodium sulfate and evaporated to dryness. Chromatography of the residue and recrystallization of the solid eluates from acetone-hexane gave the 6-methylene derivative of 3β-acetoxy - 17,20;20,21 - bis-methylenedioxy-allopregnane, M.P. 190–191° C.

A solution of 2.5 g. of the above compound in 100 cc. of chloroform was cooled to 0° C. and mixed with 1.3 molar equivalents of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. Crystallization from acetone-hexane gave the pure oxide, M.P. 192–193° C.

1 g. of the latter compound was dissolved in 50 cc. of anhydrous benzene, 1 cc. of boron trifluoride etherate recently distilled was added and the mixture kept at room temperature for 3 hours, the organic solution was washed well with water, dried over anhydrous sodium sulfate and evaporated to dryness under vacuum. Chromatography of the residue on neutral alumina gave 17,20;20,21-bismethylenedioxy-3β-acetoxy-6α-aldehydo-allopregnane.

*Example II*

A solution of 500 mg. of the above aldehyde in 25 cc. of dioxane was kept at room temperature, for 20 hours, in a sealed tube, with 2 molar equivalents of sulfur tetrafluoride. The reaction mixture was cooled and the contents of the tube poured carefully into ice water. An excess of sodium bicarbonate was added and the product extracted with methylene chloride. The extract was washed with water to neutral, dried and evaporated to dryness. After chromatography and crystallization of the solid fractions from acetonehexane, there was obtained 17,20;20,21-bis-methylenedioxy - 6α - difluoromethyl - allopregnan-3β-ol-acetate.

A solution of 350 mg. of the above compound in 15 cc. of methanol was treated with 0.2 g. of potassium hydroxide dissolved in 1 cc. of water. The mixture was kept for 2 hours at room temperature, poured into ice salt water and the formed precipitate collected by filtration, thus giving 17,20;20,21-bismethylenedioxy - 6α - difluoromethyl-allopregnan-3β-ol.

A solution of the above compound in 10 cc. of acetone was cooled to 0° C. and treated under an atmosphere of nitrogen under stirring with a solution of 8 N chromic acid (prepared by mixing 26 g. of chromium trioxide with 23 cc. of concentrated sulfuric acid and diluting with water to 100 cc.), until the color of the reagent persisted in the mixture, stirred for 5 minutes further at 0–5° C., and diluted with water and the precipitate was collected, washed with water and dried under vacuum, thus affording 17,20;20,21 - bismethylenedioxy - 6α - difluoromethyl-allopregnan-3-one.

Example III 10 g. of $\Delta^4$-pregnene-17α,21-diol-3,20-dione was converted into its bismethylenedioxy derivative, M.P. 250–252° C. according to the method described by Saret et al., in J. Am. Chem. Soc., 80, 1518 (1958).

A solution of the above compound in 50 cc. of acetic anhydride and 50 cc. of acetyl chloride was boiled for 4 hours under an atmosphere of nitrogen. The reaction mixture then was distilled almost to dryness, cooled, diluted with ether and the organic extract washed with water, then with 5% sodium bicarbonate solution and finally with water. There was thus obtained 3β-acetoxy-17,20;20,21 - bismethylenedioxy - $\Delta^{3,5}$ - pregnadiene, M.P. 161–163°.

A solution of the above crude 3-enol acetate in a mixture of 70 cc. of 95% ethanol and 30 cc. of tetrahydrofuran was cooled to 10° C. and added dropwise, with occasional stirring over a 1 hour period, to a cold (0° C.) solution of 2 g. of sodium borohydride in 40 cc. of 80° ethanol, the reaction temperature not being allowed to exceed 5° C. After completion of the addition, the solution was held at 0–5° C. for 2 hours further; it was then neutralized with acetic acid, most of the solvent was removed in vacuo, poured into ice water, extracted with ethyl acetate and the organic extract washed with water, dried over anhydrous sodium sulfate and evaporated to dryness. The residue was dissolved in 30 cc. of pyridine and 30 cc. of acetic anhydride, heated on the steam bath for 30 minutes, poured into water, heated for an additional half an hour, and the formed precipitate collected by filtration, Crystallization from acetone-hexane gave the pure 3β - acetoxy - 17,20;20,21 - bismethylenedioxy-$\Delta^5$-pregnene, M.P. 171–173°.

A suspension of 5 g. of the latter compound in 50 cc. of dioxane was treated with 6 cc. of 0.46 N perchloric acid and then with 2 g. of N-bromoacetamide; the N-bromoacetamide was added little by little, with stirring, in the course of 1 hour, in the dark and maintaining the temperature around 15° C. The mixture was stirred for 1 hour further in the dark at room temperature and then decolorized by the addition of 10% aqueous sodium bisulfite solution; 1 l. of water was added and the product was extracted with methylene chloride; the extract was washed with water, dried over anhydrous sodium sulfate and the solvent was evaporated under reduced pressure and at room temperature. The resulting 5α-bromo-6β-hydroxy compound was oxidized with an 8 N chromic acid solution, in accordance with the method of Example II, thus giving the 5α-bromo-3β-acetoxy-17,20;20,21-bismethylenedioxy-pregnan-6-one.

The above compound was mixed with 5 g. of zinc dust and 125 cc. of glacial acetic acid and heated at 90° C. for 1 hour at the end of which it was filtered through celite, the filtrate was concentrated to a small volume under reduced pressure, cooled and diluted with ice water to precipitate the 17,20;20,21-bismethylenedioxy-pregnan-3β-ol-6-one acetate, M.P. 179–180°.

Example IV 4.6 g. of triphenyl (methoxymethyl) phosphonium chloride were suspended in 100 cc. of dry ether and treated with 14 cc. of a 1 N ethereal solution of butyl lithium, the mixture was stirred for 1 hour under an atmosphere of nitrogen and then a solution of the 2 g. of the above 6-keto compound in 200 cc. of ether was added dropwise during 30 minutes, the reaction mixture was stirred for 4 hours further, then 300 cc. of dry tetrahydrofuran was added slowly to the solution while the ether was removed by distillation. When the still head temperature attained 55° C., the distillation was stopped and the mixture refluxed for 6 hours. After cooling, water was added and the product extracted with methylene chloride. The organic extract was washed to neutral with water, dried over anhydrous sodium sulfate and the solvent removed by distillation. The crude product was acetylated overnight with acetic anhydride and pyridine, and the resulting acetate was then treated with 100 cc. of ether saturated with 70% perchloric acid, the mixture let stand at room temperature for 30 minutes and then washed to neutral with water, dried over anhydrous sodium sulfate and evaporated to dryness under vacuo. The residue was chromatographed on 50 times its weight of neutral alumina, thus giving 1.1 g. of 17,20;20,21-bismethylenedioxy - 3β - acetoxy - 6α - aldehydo allopregnane identical to that obtained in Example I.

Example V

The above crude aldehyde was dissolved in 20 cc. of anhydrous tetrahydrofuran, cooled to −75° C. in a Dry Ice-acetone bath and treated with a previously cooled solution of 600 mg. of lithium aluminum t-butoxide in 20 cc. of anhydrous tetrahydrofuran. The reaction mixture was kept at −75° C. for 1 hour and then at room temperature for 30 minutes, poured into ice water and extracted several times with ethyl acetate, washed with water to neutral, dried over anhydrous sodium sulfate and evaporated to dryness under vacuum. After chromatography there was obtained the 17,20;20,21-bismethylene dioxy derivative of 6-hydroxymethyl-allopregnan-3β-ol acetate.

A solution of 1 g. of the above compound in 5 cc. of pyridine was treated with 0.5 g. of mesyl chloride and kept at room temperature for 24 hours, it was then diluted with water and the precipitate separated by filtration, thus giving 0.73 g. of the corresponding mesylate.

A suspension of 10 g. of potassium fluoride in 50 cc. of dimethyl formamide was heated to boiling and then a solution of 2 g. of the above mesylate in 10 cc. of dimethyl formamide was added. The mixture was refluxed for 5 hours, cooled and poured into water. The formed precipitate was filtered and crystallized to give 0.4 g. of the 17,20;20,21-bismethylenedioxy derivative of 6α-monofluoromethyl-allopregnan-3β-ol acetate.

The latter compound was dissolved in 25 cc. of 2% methanolic potassium hydroxide solution and then refluxed for 2 hours, neutralized with acetic acid, concentrated under vacuum to one-third its volume, poured into ice water, the precipitate collected and washed with water, dried and recrystallized from acetone-hexane, thus producing the corresponding 3-alcohol.

Upon oxidation with 8 N chromic acid in acetone solution in accordance with the method of Example II, there was obtained 6α-monofluoromethyl-17,20;20,21-bismethylenedioxy-allopregnan-3-one.

Example VI

A solution of 2 g. of 17,20;20,21-bismethylenedioxy-3β-acetoxy-allopregnane-6α-carboxaldehyde, obtained as described in Example IV, in 50 cc. of acetone was cooled to 0° C. and then oxidized with 8 N chromic acid, by following the method of Example II, thus producing the corresponding 6α-carboxylic acid. The latter compound was dissolved in 50 cc. of dioxane and treated at −70° C. with 4 equivalents of sulfur tetrafluoride. The reaction vessel was sealed and the temperature permitted to attain 20° C. After 48 hours, the reaction mixture was poured into saturated sodium bicarbonate solution, the product extracted with methylene chloride, the organic extract washed with water to neutral, dried over anhydrous sodium sulfate and evaporated to dryness: chromatography on neutral alumina gave 17,20;20,21-bismethylenedioxy-6α-trifluoromethyl-allopregnan-3β-ol acetate. Saponification of this compound, followed by oxidation, in accordance with the method of the preceding example gave the 17,20;20,21 - bismethylenedioxy - 6α - trifluoromethylallopregnan-3-one.

Example VII

A stream of diborane was passed for 1 hour through a solution of the 2 g. of 6-methylene-17,20;20,21-bismethylenedioxy-allopregnan-3β-ol acetate, obtained as described in Example I in 40 cc. of tetrahydrofuran. After this time the excess of diborane was decomposed by careful addition of water. Then 500 cc. of water was added and the formed precipitate was filtered, washed and dried, thus giving 1.8 g. of the organo-boron compound.

This material was dissolved in 40 cc. of tetrahydrofuran and treated with 1.8 g. of sodium hydroxide previously dissolved in 5 cc. of water, and 9 cc. of 35% hydrogen peroxide, stirring and keeping the temperature around 15° C. The mixture was stirred for 2 hours, the precipitated product was filtered, washed and dried, thus producing 6β-hydroxymethyl-17,20;20,21-bismethylenedioxy-allopregnan-3β-ol acetate, M.P. 226–228°.

By following the method of Example V, the above compound was converted into the corresponding mesylate and then treated with potassium fluoride in dimethyl formamide, saponified and oxidized with 8 N chromic acid, to give finally 6β-monofluoromethyl-17,20;20,21-bismethylenedioxy-allopregnan-3-one.

Example VIII

A solution of 0.76 g. of bromine (2 molar equivalents) in 15 cc. of glacial acetic acid was added dropwise, with stirring to a solution of 1 g. of 6α-monofluoromethyl-17,20;20,21-bismethylenedioxy-allopregnan-3-one in 40 cc. of acetic acid containing 5 drops of 4 N hydrogen bromide in acetic acid. After five hours at room temperature, the mixture was poured into ice water and the precipitated 2,4-dibromodrivative was collected, washed well with water, and dried. The dried material was refluxed for 14 hours with 2 g. of sodium iodide in 40 cc. of methyl ethyl ketone and then kept at room temperature for an additional 12 hours. After dilution with water, the product was extracted with ether, washed with sodium thiosulfate solution and water, and the ether was removed under reduced pressure, thus giving the 17,20;20,21-bismethylenedioxy derivative of 2-iodo-6α-monofluoromethyl-Δ⁴-pregnen-3-one.

The above crude compound was refluxed for 30 minutes with 10 cc. of collidine; after the usual work-up, including chromatography, there was obtained 17,20;20,21 - bismethylenedioxy-6α-monofluoromethyl-Δ⁴-pregnen-3-one.

The above compound was heated on the steam bath with 10 cc. of 60% formic acid for 1 hour, cooled, diluted with water and the precipitate collected, washed with water, dried and recrystallized from acetone-hexane, thus affording the pure 6α-monofluoromethyl-Δ⁴-pregnene-17α,21-diol-3,20-dione.

Example IX 2 g. of 2,4-dibromo-6α-monofluoromethyl-17,20;20,21-bismethylenedioxy - allopregnan-3-one, obtained as described in Example VIII, was dissolved in 10 cc. of dimethylformamide and added to a boiling suspension of 2 g. of calcium carbonate in 40 cc. of dimethylformamide. The mixture was refluxed with stirring for 20 minutes, filtered through celite and the filtrate diluted with ice salt water, the formed precipitate collected, washed well with water and dried. Crystallization from acetone-ether gave 6α - monofluoromethyl - 17,20;20,21 - bismethylenedioxy-Δ¹,⁴-pregnadien-3-one.

Upon treatment of this compound with 60% formic acid, in accordance with the method of the preceding example, there was obtained 6α-monofluoromethyl-Δ¹,⁴-pregnadiene-17α,21-diol-3,20-dione.

Example X

A mixture of 1 g. of 6α-monofluoromethyl-Δ¹,⁴-pregnadiene-17α,21-diol-3,20-dione, 5 cc. of pyridine and 3 cc. of acetic acid was kept at room temperature for 3 hours. It was then poured into water, the formed precipitate collected by filtration, dried and recrystallized from acetone-hexane, thus giving 6α-monofluoromethyl-Δ¹,⁴-pregnadiene-17α,21-diol-3,20-dione 21-monoacetate.

Example XI

By following the methods of Examples VIII and IX, but using the 6α-difluoromethyl and 6α-trifluoromethyl derivatives of 17,20;20,21-bismethylenedioxy-allopregnan-3-one as starting materials, there were obtained, respectively 6α - difluoromethyl-Δ⁴-pregnene-17α,21-diol-3,20-dione, 6α - difluoromethyl-Δ¹,⁴-pregnadiene-17α,21-diol-3, 20-dione, 6α - trifluoromethyl-Δ⁴-pregnene-17α,21-diol-3, 20-dione and 6α - trifluoromethyl-Δ¹,⁴-pregnadiene-17α,-21-diol-3,20-dione. Treatment with acetic anhydride in pyridine solution gave the corresponding 21-acetates.

Example XII

A mixture of 1 g. of 6α-monofluoromethyl-Δ¹,⁴-pregnadiene-17α,21-diol-3,20-dione 21-acetate, 3 cc. of propionic anhydride, 75 cc. of anhydrous benzene and 500 mg. of p-toluenesulfonic acid was kept at room temperature for 18 hours, poured into ice and water and the mixture was stirred to effect hydrolysis of the excess anhydride. The product was extracted with ether and the organic extract was washed with sodium hydroxide solution and water. Drying, evaporation and crystallization of the residue from ether-hexane produced the 6α-monofluoromethyl - Δ¹,⁴ - pregnadiene-17α,21-diol-3,20-dione-17α-propionate 21-acetate.

Example XIII

A mixture of 2.5 g. of 6α-trifluoromethyl-Δ⁴-pregnene-17α,21 - diol-3,20-dione 21-acetate, 5 g. of chloranil, 45 cc. of ethyl acetate and 12.5 cc. of acetic acid was refluxed under an atmosphere of nitrogen for 96 hours. The mixture was cooled, washed with a cold aqueous solution of 10% sodium hydroxide until the washings were colorless. The organic extract dried over anhydrous sodium sulfate and the ethyl acetate was evaporated. By chromatography of the residue on neutral alumina there was obtained 6-trifluoromethyl - Δ⁴,⁶ - pregnadiene-17α,21-diol-3,20-dione 21-acetate.

By the same method, 6α-monofluoromethyl-Δ¹,⁴-pregnadiene - 17α,21 - diol-3,20-dione 21-monoacetate and 6α-difluoromethyl - Δ⁴ - pregnene-17α,21-diol-3,20-dione 21-monoacetate were converted into 6-monofluoromethyl-Δ¹,⁴,⁶ - pregnatriene-17α,21-diol-3,20-dione 21-acetate, and 6 - difluoromethyl-Δ⁴,⁶-pregnadiene-17α,21-diol-3,20-dione 21-acetate.

Example XIV

A solution of 8 g. of 16α-methyl-Δ⁵-pregnen-3β-ol-20-one acetate in 100 cc. of chloroform containing a few drops of pyridine was cooled to 0° C. and slowly treated under stirring with a cool solution of chlorine in chloroform containing 1.05 molar equivalents of chlorine. The mixture was allowed to reach room temperature, the excess of chlorine was removed by flushing with dry air and the solution was washed with 5% aqueous sodium bicarbonate solution and wtaer, dried over anhydrous sodium sulfate and evaporated to dryness. Crystallization of the residue from methanol-benzene afforded 16α-methyl-5α,6β-dichloro-pregnan-3β-ol-20-one acetate.

A mixture of 8 g. of the above compound, 3.6 g. of p-toluenesulfonic acid and 400 cc. of acetic anhydride was subjected to a slow distillation for 24 hours, distilling 320 cc. during this period. The residue was cooled, poured into ice water and the product was extracted with ether;

the extract was washed with 5% aqueous sodium carbonate solution and then with water, dried over anhydrous sodium sulfate and evaporated to dryness. The oily residue consisted of crude 16α-methyl-5α,6β-dichloro-Δ$^{17(20)}$-pregnene-3,20-diol diacetate. The above compound was treated with a benzenic solution of perbenzoic acid containing 1.2 equivalents of the peracid and the mixture was kept overnight at room temperature and then diluted with water, the organic layer was separated, washed with aqueous sodium bicarbonate solution and water, dried over anhydrous sodium sulfate and the solvent was evaporated. The residue consisted of the crude 16α-methyl-5α,6β-dichloro-17α,20-oxido-pregnane-3β,20-diol diacetate.

The above crude compound was dissolved in 100 cc. of methanol and treated with 8 g. of sodium hydroxide, dissolved in 50 cc. of 50% ethanol-water and the mixture kept at room temperature for 1 hour. It was then acidified with acetic acid, concentrated to a small volume under reduced pressure and the product was precipitated by the addition of ice water. The precipitate was collected by filtration, washed with water, dried and crystallized from acetone-ether. There was thus obtained 16α-methyl-5α,6β-dichloro-pregnane-3β,17α-diol-20-one.

A mixture of the above compound, 300 cc. of 80% acetic acid and 8 g. of zinc dust was heated to 80° C. over a period of 30 minutes with continuous stirring, cooled, filtered, and the filtrate was evaporated to dryness under reduced pressure. By crystallization of the residue from methanol-water there was obtained 16α-methyl-Δ$^5$-pregnene-3β,17α-diol-20-one.

A cooled solution of 4 g. of the latter compound in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving 16α-methyl-21-iodo-Δ$^5$-pregnene-3β,17α-diol-3-one. This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding 16α-methyl-Δ$^5$-pregnene-3β,17α,21-triol-20-one 21-monoacetate.

A solution of 2 g. of the above compound in 8 cc. of pyridine was treated with 4 cc. of benzoyl chloride and then heated on the steam bath for 3 hours. The mixture was then poured into ice water and the formed precipitate collected, washed with water and dried. The resulting 16α-methyl-Δ$^5$-pregnene-3β,17α,21-triol-20-one 3-benzoate 21-acetate was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol was distilled under reduced pressure. The residue was triturated with water and the solid was collected, washed with water, dried and recrystallized from ethyl acetate-methanol, thus producing 16α-methyl-Δ$^5$-pregnene-3β,17α,21-triol-20-one 3-benzoate.

In the same manner, starting with 16β-methyl-Δ$^5$-pregnen-3β-ol-20-one acetate, there was finally obtained 16β-methyl-Δ$^5$-pregnene-3β,17α,21-triol-20-one 3-benzoate.

*Example XV*

By following the methods of Examples I and II, 10 g. of 16α-methyl-Δ$^5$-pregnene-3β,17α,21-triol-20-one 3-benzoate was converted into the bismethylenedioxy derivative and then successively into 16α-methyl-6α-hydroxy-3β-benzoyloxy-17,20;20,21-bismethylenedioxy-allopregnane, 16α-methyl-3β-benzoyloxy-17,20;20,21-bismethylenedioxy-allopregnan-6-one, 6-methylene-16α-methyl-3β-benzoyloxy-17,20;20,21-bismethylenedioxy-allopregnane, 6α-aldehydo-16α-methyl-3β-benzoyloxy-17,20;20,21-bismethylenedioxy-allopregnane and 6α-difluoromethyl-16α-methyl-3β-benzoyloxy-17,20;20,21-bismethylenedioxy-allopregnane.

A solution of 1 g. of the above compound in 50 cc. of methanol was refluxed for 3 hours with 500 mg. of potassium hydroxide dissolved in 1 cc. of water; it was then poured into ice water, the precipitate collected, washed with water to neutral and dried, thus producing 6α-difluoromethyl-16α-methyl-17,20;20,21-bismethylenedioxy-allopregnan-3β-ol. Upon oxidation with 8 N chromic acid in acetone solution, in accordance with the method of Example II, there was obtained 6α-difluoromethyl-16α-methyl-17,20;20,21-bismethylenedioxy-allopregnan-3-one.

*Example XVI*

In accordance with the methods of Examples VIII and IX, the latter compound obtained in the preceding example was converted into 6α-difluoromethyl-16α-methyl-Δ$^4$-pregnene-17α,21-diol-3,20-dione and 6α-difluoromethyl-16α-methyl-Δ$^{1,4}$-pregnadiene-17α,21-diol-3,20-dione.

*Example XVII*

Examples XV and XVI were repeated, but using 16β-methyl-Δ$^5$-pregnene-3β,17α,21-triol 20-one 3-benzoate as starting material. There were thus obtained as final products, 6α-difluoromethyl-16β-methyl-17,20;20,21-bismethylenedioxy-allopregnan-3-one, 6α-difluoromethyl-16β-methyl-Δ$^4$-pregnene-17α,21-diol-3,20-dione and 6α-difluoromethyl-16β-methyl-Δ$^{1,4}$-pregnadiene-17α,21-diol-3,20-dione.

*Example XVIII*

A solution of 1 g. of 6α-difluoromethyl-16α-methyl-Δ$^{1,4}$-pregnadiene-17α,21-diol-3,20-dione, obtained in Example XVI, 1 g. of p-toluenesulfonic acid, 50 cc. of acetic acid and 10 cc. of acetic anhydride was kept at room temperature for one hour; it was then poured into water and stirred until the excess of anhydride was hydrolyzed. Isolation of the product of ethyl acetate extraction and crystallization of the residue from acetone-ether gave 6α-difluoromethyl-16α-methyl-Δ$^{1,4}$-pregnadiene-17α,21-diol-3,20,dione 17,21-diacetate.

*Example XIX*

In accordance with the method of the preceding example, 6α-trifluoromethyl-Δ$^{1,4}$-pregnadiene-17α,21-diol-3,20-dione, 6α-monofluoromethyl-Δ$^{1,4}$-pregnadiene-17α,21-diol-3,20-dione and 6α-difluoromethyl-16β-methyl-Δ$^{1,4}$-pregnadiene-17α,21-diol-3,20-dione were converted into the corresponding 17,21-diacetates.

*Example XX*

A mixture of 1 g. of 6α-monofluoromethyl-16α-methyl-Δ$^4$-pregnene-17α,21-diol-3,20-dione, 4 cc. of pyridine and 4 cc. of acetic anhydride was heated on the steam bath for one hour, poured into water, and the formed precipitate collected by filtration, washed with water and dried.

A mixture of the above crude product, 2 g. of chloranil, 15 cc. of ethyl acetate and 5 cc. of acetic acid was refluxed under an atmosphere of nitrogen for 96 hours. It was then cooled, washed with a cold aqueous 10% sodium hydroxide solution until the washings were colorless, dried over anhydrous sodium sulfate and the ethyl acetate was evaporated. Chromatography of the residue on neutral alumina gave the pure 6-monofluoromethyl-16α-methyl-Δ$^{4,6}$-pregnadiene-17α,21-diol-3,20-dione 21-acetate.

By the same method, 6α-difluoromethyl-16α-methyl-Δ$^4$-pregnene-17α,21-diol-3,20-dione and 6α-trifluoromethyl-16β-methyl-Δ$^{1,4}$-pregnadiene-17α,21-diol-3,20-dione were converted into the corresponding acetates and then into 6-difluoromethyl-16α-methyl-Δ$^{4,6}$-pregnadiene-17α,21-diol-3,20-dione 21-acetate and 6-trifluoromethyl-16β- methyl-$\Delta^{1,4,6}$-pregnatriene-17α,21-diol-3,20-dione 21-acetate.

Example XXI

A solution of 5 g. of 6α-monofluoromethyl-$\Delta^4$-pregnene-17α,21-diol-3,20-dione, obtained as described in Example VIII, in 100 cc. of a mixture of pyridine and chloroform (9:1) was cooled to 0° C. Under stirring there was added batchwise 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and the solvent was evaporated under reduced pressure. Thus there was obtained the crude 21-tosylate of 6α-monofluoromethyl-$\Delta^4$-pregnene-17α,21-diol-3,20-dione.

A solution of 2.5 g. of the above crude compound in 100 cc. of glacial acetic acid was treated with 7 g. of sodium iodide and the mixture was refluxed for 2 hours, poured into ice water and extracted several times with methylene chloride; the extracts were combined, washed successively with aqueous sodium carbonate solution, sodium sulfite solution and water and then evaporated. By crystallization of the residue from acetone-hexane there was obtained 6α-monofluoromethyl-$\Delta^4$-pregnen-17α-ol-3,20-dione.

A solution of 1 g. of the above compound in 50 cc. of benzene was treated with 2 cc. of acetic anhydride and 1 g. of p-toluenesulfonic acid; the mixture was kept at room temperature for 48 hours, washed well with water, sodium carbonate solution and water to neutral, dried over anhydrous sodium sulfate and evaporated to dryness; by chromatography of the residue on neutral alumina and recrystallization of the solid eluates from acetone-hexane, there was obtained 6α-monofluoromethyl-17α-acetoxy-progesterone.

Example XXII

In accordance with the method of the preceding example, 6α-difluoromethyl-$\Delta^4$-pregnene-17α,21-diol-3,20-dione and 6α-trifluoromethyl-$\Delta^4$-pregnene-17α,21-diol-3,20-dione were converted respectively into 6α-difluoromethyl-17α,21-diol-3,20-dione 21-tosylate, 6α-difluoromethyl-17α-hydroxy-progesterone and 6α-difluoromethyl-17α-acetoxy-progesterone and 6α-trifluoromethyl-17α,21-diol-3,20-dione 21-tosylate, 6α-trifluoromethyl-17α-hydroxy-progesterone and 6α-trifluoromethyl-17α-acetoxy-progesterone.

Example XXIII

A mixture of 500 mg. of 6α-difluoromethyl-17α-acetoxy-progesterone, 10 cc. of dioxane and 350 mg. of 2,3-dichloro-5,6-dicyano-1,4-benzoquinone was refluxed for 18 hours. It was then cooled, the 2,3-dichloro-5,6-dicyano-1,4-benzohydroquinone formed during the reaction filtered off and the filtrate evaporated to dryness. The residue was dissolved in acetone and filtered through 10 g. of alumina. Crystallization from acetone-hexane gave the acetate of 6α-difluoromethyl-$\Delta^{1,4}$-pregnadien-17α-ol-3,20-dione.

In a similar manner, 6α-monofluoromethyl-17α-hydroxy-progesterone and 6α-trifluoromethyl-17α-acetoxy-progesterone were converted into the corresponding 1-dehydro derivatives, namely 6α-monofluoromethyl-$\Delta^{1,4}$-pregnadien-17α-ol-3,20-dione and 6α-trifluoromethyl-$\Delta^{1,4}$-pregnadien-17α-ol-3,20-dione acetate.

Example XXIV

A mixture of 1 g. of 6α-difluoromethyl-16β-methyl-$\Delta^{1,4}$-pregnadiene-17α,21-diol (cf. Example XVII), 2 g. of chloranil and 50 cc. of terbutanol was refluxed for 24 hours. The mixture was cooled, the excess of chloranil filtered and washed with ethyl acetate and the organic extracts washed with a cold aqueous solution of 10% sodium hydroxide until the washings were colorless. It was then dried over anhydrous sodium sulfate and the ethyl acetate was evaporated. Recrystallization from methylene chloride ether, after decolorization with 5 g. of alumina gave 6-difluoromethyl-16β-methyl-$\Delta^{1,4,6}$-pregnatriene-17α,21-diol.

By following the method of Example XXI, the latter compound was converted into 6-difluoromethyl-16β-methyl-$\Delta^{1,4,6}$-pregnatrien-17α-ol-3,20-dione and 6-difluoromethyl-16β-methyl-$\Delta^{1,4,6}$-pregnatrien-17α-ol-3,20-dione acetate.

Example XXV

In accordance with the method of Example XXIV, 6α-trifluoromethyl-17α-acetoxy-progesterone, 6α-difluoromethyl-$\Delta^{1,4}$-pregnadien-17α-ol-3,20-dione 17-acetate and 6α-monofluoromethyl-17α-acetoxy-progesterone were treated with chloranil in ter-butanol, thus affording 6-trifluoromethyl-$\Delta^{4,6}$-pregnadien-17α-ol-3,20-dione acetate, 6-difluoromethyl-$\Delta^{1,4,6}$-pregnatrien-17α-ol-3,20-dione acetate and 6-monofluoromethyl-$\Delta^{4,6}$-pregnadien-17α-ol-3,20-dione acetate.

Example XXVI

A mixture of 5 g. of 16α-methyl-$\Delta^4$-pregnene-17α,21-diol-3,20-dione, 150 cc. of anhydrous benzene, 60 cc. of ethyleneglycol distilled over sodium hydroxide and 800 g. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 16α-methyl-3,20-bis-ethylenedioxy-$\Delta^5$-pregnene-17α,21-diol.

4 g. of the above compound was dissolved in 80 cc. of chloroform, cooled to 0° C., mixed with an ether solution of monoperphthalic acid containing 1.2 molar equivalents of the reagent and kept in the dark at a temperature between 0 and 5° C. for 16 hours. The mixture was diluted with water and the organic layer was separated and washed with sodium bicarbonate solution and water to neutral, dried over anhydrous sodium sulfate and evaporated. Crystallization of the residue from acetone-hexane yielded 16α-methyl-3,20-bis-ethylenedioxy-5α,6α-oxido-pregnane-17α,21-diol.

A solution of 2.5 g. of the above epoxide in 125 cc. of anhydrous tetrahydrofuran was added slowly over 45 minutes with stirring, at a temperature between −20° C. and −10° C. and under an atmosphere of nitrogen to a solution of 1.5 g. of trifluoromethyl-magnesium iodide, in 75 cc. of tetrahydrofuran prepared according to the directions of Haszeldine et al. in J. Chem. Soc. 1273 (1954). Stirring was continued for 2 hours further at 0° C., there was then added 100 cc. of aqueous saturated concentrated ammonium chloride solution followed by 20 cc. of aqueous concentrated sodium acetate solution, extracted with ethyl acetate and the organic solution washed to neutral, dried over anhydrous sodium sulfate and evaporated to dryness under reduced pressure. There was thus obtained 6β-trifluoromethyl-16α-methyl-3,20-bis-ethylenedioxy-pregnane-5α,17α,21-triol.

A slow stream of dry hydrogen chloride was introduced for 4 hours into a solution of 1 g. of the above compound in 100 cc. of glacial acetic acid, maintaining the temperature around 20° C. The mixture was then poured into ice water and the precipitate collected by filtration, washed with water, dried and recrystallized from ethyl acetate-hexane thus yielding 6α-trifluoromethyl-16α-methyl-$\Delta^4$-pregnene-17α,21-diol-3,20-dione.

Treatment of the above compound with acetic anhydride in pyridine solution in a conventional manner gave the corresponding 21-acetate.

Example XXVII

By following the method of Example XXI, 1 g. of 6α-trifluoromethyl-16α-methyl-$\Delta^4$-pregnene-17α,21-diol-3,20-dione, obtained as described in the preceding example, was converted into the 21-tosylate, 6α-trifluoromethyl-16α-methyl-17α-hydroxy-progesterone and 6α-trifluoromethyl-16α-methyl-17α-acetoxy-progesterone.

Treatment of the latter compound with 2,3-dichloro-5,6-dicyano-1,4-benzoquinone, in accordance with the method of Example XXIII, gave 6α-trifluoromethyl-16α-methyl-$\Delta^{1,4}$-pregnadien-17α-ol-3,20-dione 17-acetate.

*Example XXVIII*

By following the method of Arkel and Janetsky (Rec. Trav. Chim., 56, 167 (1937)); there was prepared fluoroiodomethane, this compound was treated with magnesium in tetrahydrofuran, according to the method described by Haszeldine (J. Chem. Soc. 1275 (1954)) in order to obtain monofluoromethyl magnesium iodide, using 2 g. of magnesium, 5 g. of fluoroiodomethane and 150 cc. of tetrahydrofuran there was obtained a solution containing 3.0 g. of the desired reagent. The above solution was kept at a temperature of approximately —30° C.

5 g. of 17α-hydroxy-progesterone were converted into the 3,20-bis-ethylenedioxy derivative and then into 5α,6α-epoxido-3,20-bis-ethylenedioxy-pregnan-17α-ol.

A solution of 5 g. of the above epoxide in 250 cc. of anhydrous tetrahydrofuran was added slowly over 45 minutes with stirring, at a temperature between —20° C. and —10° C. and under an atmosphere of nitrogen to a solution of 3 g. of monofluoromethyl magnesium iodide in 150 cc. of tetrahydrofuran previously prepared. Stirring was continued for 2 hours further at 0° C., there was then added 100 cc. of aqueous saturated ammonium chloride solution followed by 30 cc. of aqueous concentrated sodium acetate solution, extracted with ethyl acetate and the organic solution washed to neutral, dried over anhydrous sodium sulfate and evaporated to dryness under reduced pressure. There was thus obtained 6β-monofluoromethyl-3,20-bisethylenedioxy-pregnane-5α,17β-diol. Upon treatment of the above compound with hydrogen chloride in acetic acid, in accordance with the method of Example XXVI, there was obtained 6α-monofluoromethyl-17α-hydroxyprogesterone, identical to that obtained in Example XXI.

*Example XXIX*

In accordance with the method of the preceding example, 5 g. of 17α-hydroxy-19-nor-progesterone were converted into 6α-monofluoromethyl-17α-hydroxy-19-nor-progesterone. Treatment of the above compound with acetic anhydride-p-toluenesulfonic acid, in benzene solution gave 6α-monofluoromethyl-17α-acetoxy-19-nor-progesterone.

Upon treatment of the above compound with chloranyl in mixture of ethyl acetate and acetic acid, in accordance with the method of Example XIII, there was obtained 6-monofluoromethyl - 19 - nor - $\Delta^{4,6}$ - pregnadien - 17α - ol - 3,20-dione acetate.

*Example XXX*

By following the method of Example XXVI, 5 g. of $\Delta^4$-pregnen-21-ol-3,20-dione (desoxycorticosterone) was converted into 3,20-bisethylenedioxy-$\Delta^5$-pregnen-21-ol; 5α,6α-oxido-3,20-bisethylenedioxy-pregnan-21-ol; 6β - trifluoromethyl-3,20-bisethylenedioxy-pregnane-5α,21-diol and 6α-trifluoromethyl-$\Delta^4$-pregnen-21-ol-3,20-dione.

A mixture of 1 g. of the above compound, 4 cc. of pyridine and 2 cc. of cyclopentylpropionic anhydride was kept at room temperature overnight, poured into ice water, the formed precipitate was filtered, washed with water and dried. Crystallization from acetone-hexane gave the cyclopentylpropionate of 6α-trifluoromethyl-$\Delta^4$-pregnen-21-ol-3,20-dione.

*Example XXXI*

10 g. of $\Delta^5$-pregnene-3β,17α-diol-20-one 3-monobenzoate were converted into the 20-ethylenedioxy derivative, in accordance with the method of Example XXVI.

A stream of diborane was passed through a solution of the above compound in 25 cc. of tetrahydrofuran for 1 hour. (After 20 minutes the solution became warm and then the temperature slowly subsided.) The excess of diborane was decomposed by careful addition of water. Then 1 l. of water was added and the formed precipitate was filtered, washed and dried, thus giving 9.6 g. of the organoboron compound.

This material was dissolved in 200 cc. of methanol and treated with 9 g. of sodium hydroxide previously dissolved in 25 cc. of water, and 45 cc. of 35% hydrogen peroxide, stirring and keeping the temperature around 15° C. The mixture was stirred for 2 hours, after this time, the precipitated product was filtered, washed and dried, thus producing 6α-hydroxy-3β-benzoyloxy-17α-hydroxy-20-ethylenedioxy-allopregnane.

A solution of 6 g. of the above compound in 120 cc. of pyridine was added to a mixture of 6 g. of chromium trioxide in 120 cc. of pyridine. The reaction mixture was kept at room temperature overnight. It was then diluted with ethyl acetate, filtered through celite and the filtrate was washed well with water, dried and evaporated almost to dryness, until crystallization started; there was thus obtained 6-keto - 3β-benzoyloxy - 17α-hydroxy-20-ethylenedioxy-allopregnane.

A suspension of 14.5 g. of triphenylphosphonium methyl bromide in 250 cc. of anhydrous ether was treated, under an atmosphere of nitrogen, with 40 cc. of a 1 N etheral solution of butyl lithium and the mixture was stirred for 2 hours at room temperature. A solution of 5 g. of the 6-keto-steroid obtained in the previous experiment was then added dropwise, in the course of 15 minutes and with stirring. The reaction mixture was stirred for 6 hours further and let stand at room temperature overnight. The ether was displaced with dry tetrahydrofuran by distillation and then refluxed for 8 hours. It was then cooled, diluted with water and extracted several times with ethyl acetate, the organic extract was washed with water, dried over anhydrous sodium sulfate and evaporated to dryness. Chromatography of the residue and recrystallization of the solid eluates from acetone-hexane gave the 6-methylene derivative of 3β-benzoyloxy-17α-hydroxy - 20-ethylenedioxy-allopregnane.

A stream of diborane was passed during 1 hour through a solution of 2 g. of the above compound, in 40 cc. of tetrahydrofuran. After this time the excess of diborane was decomposed by careful addition of water. Then 500 cc. of water was added and the formed precipitate was filtered, washed and dried, thus giving 1.8 g. of the organoboron compound.

This material was dissolved in 40 cc. of tetrahydrofuran and treated with 1.8 g. of sodium hydroxide previously dissolved in 5 cc. of water, and 9 cc. of 35% hydrogen peroxide, stirring and keeping the temperature around 15° C. The mixture was stirred for 2 hours, the precipitated product was filtered, washed and dried, thus producing 6α-hydroxymethyl-3-benzoyloxy-17α-hydroxy-20-ethylenedioxy-allopregnane.

A solution of 1 g. of the above compound in 5 cc. of pyridine was treated with 0.5 g. of mesyl chloride and kept at room temperature for 24 hours, it was then diluted with water and the precipitate separated by filtration, thus giving the corresponding mesylate.

A suspension of 5 g. of potassium fluoride in 25 cc. of dimethyl formamide was heated to boiling and then a solution of 1 g. of the above mesylate in 6 cc. of dimethyl formamide was added. The mixture was refluxed for 5 hours, cooled and poured into water, and the formed precipitate filtered and crystallized from acetone-ether, to give the 20-ethyleneketal of 6β-monofluoromethyl-allopregnane-3β,17β-diol-3-benzoate.

The latter compound was dissolved in 25 cc. of 2% methanolic potassium hydroxide solution and then refluxed for 2 hours, neutralized with acetic acid, concentrated under vacuo to one-third its volume, poured into ice salt water, the precipitate collected and washed with water, dried and recrystallized from acetone-hexane, thus producing the 20-ethyleneketal of 6α-monofluoromethyl-allopregnane-3β,17α-diol.

A solution of 500 mg. of the above compound in 25 cc. of acetone was cooled to 0° C. and treated, under an atmosphere of nitrogen with an 8 N solution of chromium trioxide, in accordance with the method of Example II, thus affording the 20-ethyleneketal of 6α-monofluoromethyl-allopregnan-17α-ol-3-one.

Treatment of 2 g. of the above compound with 2,3-dichloro-5,6-dicyano-1,4-benzoquinone in dioxane, in accordance with the method of Example XXIII gave the 20-ethyleneketal of 6α-monofluoromethyl-$\Delta^{1,4}$pregnadien-17α-ol-3-one.

A solution of 500 mg. of the latter compound in 25 cc. of acetone was treated with 0.1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 6α-monofluoromethyl-$\Delta^{1,4}$-pregnadien-17α-ol-3,20-dione.

*Example XXXII*

To a solution of 1 g. of the latter compound in 75 cc. of tetrahydrofuran and 4.5 g. of methanol was added under vigorous stirring 6 g. of calcium oxide and then 6 g. of iodine; the stirring was continued at room temperature until the color of the solution became pale yellow and then the mixture was poured into ice water containing 4 cc. of acetic acid and 500 mg. of sodium thiosulfate, stirred for 15 minutes, most of the liquid was separated by decantation and the precipitate was collected, washed with water and dried under vacuum. The resulting 21-iodo compound was mixed with 20 cc. of acetone and 3 g. of recently fused potassium acetate and the mixture refluxed for 8 hours, diluted with water and extracted with ethyl acetate; the extract was washed with water, dried over anhydrous sodium sulfate and concentrated until crystallization started. There was thus obtained 6α-monofluoromethyl-$\Delta^{1,4}$-pregnadiene-17α,21-diol-3,20-dione 21-acetate, identical to that obtained in Example X.

A solution of 500 mg. of the latter compound in 50 cc. of methanol and 5 cc. of a 2 N aqueous potassium hydroxide solution was allowed to stand at room temperature under a nitrogen atmosphere for 1 hour. The solution was then neutralized with acetic acid, concentrated without heating to one-third its volume, poured into water and the solid collected by filtration. Crystallization from methanol-water gave 6α-monofluoromethyl-$\Delta^{1,4}$-pregnadiene-17α,21-diol-3,20-dione.

*Example XXXIII*

In accordance with the method of Example XXIV, 2 g. of 6α-monofluoromethyl-$\Delta^{1,4}$-pregnadien-17α-ol-3,20-dione were treated with chloranil in t-butanol thus giving 6 - monofluoromethyl - $\Delta^{1,4,6}$-pregnatrien-17α-ol-3,20-dione.

The above compound was acetoxylated at C-21 by treatment with iodine-calcium in mixture with tetrahydrofuran-methanol, followed by treatment with potassium acetate in acetone, by following the method of the preceding example, thus giving 6-monofluoromethyl-$\Delta^{1,4,6}$-pregnatriene-17α,21-diol-3,20-dione 21-monoacetate.

*Example XXXIV*

A solution of 2.5 g. of 17,20;20,21-bismethylenedioxy-$\Delta^5$-pregnen-3β-ol acetate in 100 cc. of chloroform was cooled to 0° C. and mixed with 1.3 molar equivalents of monoperphthalic acid in ether solution. The mixture was kept at 0° C. for 20 hours, diluted with water, the organic layer was separated, washed with aqueous sodium bicarbonate solution and then with water to neutral, dried over anhydrous sodium sulfate and evaporated to dryness. Crystallization from acetone-hexane gave the pure 5α,6α-epoxide.

The above compound was treated with trifluoromethyl-magnesium iodide, in tetrahydrofuran solution, in accordance with the method of Example XXVI, thus giving 6β-trifluoromethyl - 17,20;20,21 - bismethylenedioxy-pregnane-3β,5α-diol.

Upon oxidation of the above compound with 8 N chromic acid in acetone solution, in accordance with the method of Example II, there was obtained 6β-trifluoromethyl - 17,20;20,21 - bismethylenedioxy - pregnan-5α-ol-3-one.

A slow stream of dry hydrogen chloride was introduced for 4 hours into a solution of 0.5 g. of the above compound in 40 cc. of acetic acid, maintaining the temperature around 15° C. After pouring into ice water the precipitate was filtered and dried. Recrystallization from acetone-hexane afforded 6α-trifluoromethyl-17,20;20,21-bismethylenedioxy-$\Delta^4$-pregnen-3-one.

300 mg. of the latter bismethylenedioxy derivative was heated on the steam bath with 6 cc. of 60% formic acid for 1 hour, cooled, diluted with water and the precipitate was collected, washed with water, dried and recrystallized from acetone-hexane, thus affording 6α-trifluoromethyl-$\Delta^4$-pregnene-17α,21-diol-3,20-dione, identical with the compound obtained in Example XI. Treatment of the above compound with propionic anhydride in pyridine solution, 1 hour on the steam bath, gave the corresponding propionate.

*Example XXXV*

A mixture of 1 g. of the propionate of 6α-trifluoromethyl-$\Delta^4$-pregnene-17α,21-diol-3,20-dione, 50 cc. of t-butanol, 0.4 g. of recently sublimed selenium dioxide and 0.2 cc. of pyridine was refluxed under an atmosphere of nitrogen for 48 hours, cooled, filtered through celite and the filtrate was evaporated under reduced pressure. The residue was refluxed with acetone and decolorizing charcoal for 1 hour, filtered through celite and the solvent was evaporated. By chromatography of the residue one neutral alumina, there was obtained the 21-propionate of 6α - trifluoromethyl - $\Delta^{1,4}$-pregnadiene-17α,21-diol-3,20-dione.

Upon treatment of the above compound with chloranil in t-butanol, in accordance with the method of Example XXIV, there was produced 6-trifluoromethyl-$\Delta^{1,4,6}$-pregnatriene-17α,21-diol-3,20-dione 21-propionate.

*Example XXXVI*

By essentially following the method of Example XXXIV, but using monofluoromethyl-magnesium iodide, there was obtained 6α-monofluoromethyl-$\Delta^4$-pregnene-17α,21-diol-3,20-dione, identical to that obtained in Example VIII.

1 g. of the above compound was allowed to react overnight at room temperature with 5 cc. of acetic anhydride and 1 g. of p-toluenesulfonic acid in 50 cc. of acetic acid. The mixture was then poured into ice water and the solid formed was collected, washed with water, dried and treated with 50 cc. of 1% methanolic potassium hydroxide, under an atmosphere of nitrogen, at 5° C. for 4 hours. It was acidified with acetic acid, concentrated to a small volume and the precipitate was collected, washed with water, dried and crystallized from acetone-hexane. There was thus obtained 6α-monofluoromethyl-17α,21-diacetoxy-$\Delta^4$-pregnene-3,20-dione.

*Example XXXVII*

A stirred mixture of 10 g., of the 3-acetate of $\Delta^5$-pregnene-3β,17α-diol-20-one, 650 cc. of benzene, 20 cc. of ethylene glycol and 0.5 g. of p-toluenesulfonic acid was boiled for 8 hours, a water separator being employed. The cooled mixture was washed with 5% sodium carbonate solution and water until neutral, dried and evaporated. Crystallization from acetone yielded 3β-acetoxy-20-ethylenedioxy-$\Delta^4$-pregnen-17α-ol.

By following the method of Example I the above compound was converted successively into 20-ethylenedioxy-allopregnane-3β,6α,17α-triol-3-monoacetate, 20-ethylenedioxy - allopregnane-3β,17α-diol-6-one-3-monoacetate, 6-methylene - 20 - ethylenedioxy-allopregnane-3β,17α-diol-3-monoacetate and 6α-aldehydo - 20 - ethylenedioxy-allopregnane-3β,17α-diol-3-monoacetate.

A solution of 1 g. of the above aldehyde in 50 cc. of dioxane was kept at room temperature for 48 hours in a sealed tube with 2 molar equivalents of sulfur tetrafluoride. The reaction mixture was cooled and the contents of the tube poured carefully into an ice cold saturated solution of sodium bicarbonate and the product extracted with methylene chloride. The extract was washed with water to neutral, dried and evaporated to dryness. After chromatography and crystallization of the solid fractions from acetone-hexane, there was obtained 20-ethylenedioxy - 6α-difluoromethyl-allopregnan-3β,17α-diol-3-monoacetate.

A solution of 800 mg. of the above compound in 40 cc. of methanol was treated with 0.3 g. of potassium hydroxide dissolved in 1 cc. of water. The mixture was kept for 2 hours at room temperature, poured into ice salt water and the formed precipitate collected by filtration, thus giving 20-ethylenedioxy-6α-difluoromethylallopregnan-3β,17α-diol.

Oxidation of the above compound with chromium trioxide in acetone solution, in accordance with the method of Example II, gave 20-ethylenedioxy-6α- difluoromethyl-allopregnan-17α-ol-3-one.

A mixture of 1 g. of the above compound, 40 cc. of dioxane and 500 mg. of 2,3-dichloro-5,6-dicyanobenzoquinone was refluxed for 18 hours, cooled, and the 2,3-dichloro-5,6-dicyano-1,4-benzoquinone formed during the reaction was filtered off and the filtrate evaporated to dryness. Chromatography of the residue gave 20-ethylenedioxy-6α-difluoromethyl-$\Delta^{1,4}$-pregnadien-17α-ol-3,20-dione.

500 mg. of the above compound were dissolved in 30 cc. of acetone and treated with 50 mg. of p-toluenesulfonic acid, the reaction mixture was kept at room temperature overnight. It was then poured into ice water, extracted with ethyl acetate and the organic extract washed with water to neutral, dried and evaporated to dryness. Addition of ether gave 6α-difluoromethyl-$\Delta^{1,4}$-pregnadien-17α-ol-3,20-dione.

Upon treatment of a benzenic solution of the above compound with acetic anhydride in the presence of p-toluenesulfonic acid, in accordance with the method of Example XXI, there was obtained 6α-difluoromethyl-$\Delta^{1,4}$-pregnadien-17α-ol-3,20-dione acetate.

In accordance with the method of Example XIII, treatment of the latter compound with chloranil in mixture with ethyl acetate and acetic acid gave 6-difluoromethyl-$\Delta^{1,4,6}$-pregnatrien-17α-ol-3,20-dione acetate.

*Example XXXVIII*

By following the method of Example XXIV, 6α-trifluoromethyl - 16α - acetoxy-progesterone, obtained as described in Example XXVII was treated with chloranil in t-butanol, thus giving 6-trifluoromethyl-16α-methyl-$\Delta^{4,6}$-pregnadien-17α-ol-3,20-dione acetate.

*Example XXXIX*

By following the method of Examples XIII and XXI, 6α - difluoromethyl - 16α-methyl-$\Delta^4$-pregnene-17α,21-diol-3,20-dione, obtained in Example XVI, was converted successively into 6-difluoromethyl-16α-methyl-$\Delta^{4,6}$-pregnadiene-17α,21-diol-3,20-dione, 6 - difluoromethyl-16α-methyl-$\Delta^{4,6}$-pregnadiene-17α,21-diol-3,20-dione 21-tosylate, 6-difluoromethyl - 16α-methyl-$\Delta^{4,6}$-pregnadien-17α-ol-3,20-dione and 6-difluoromethyl-16α-methyl-$\Delta^{4,6}$-pregnadien-17α-ol-3,20-dione acetate.

*Example XL*

1.2 g. of 6-monofluoromethyl-16α-methyl-$\Delta^{4,6}$-pregnadiene - 17α,21 - diol-3,20-dione 21-acetate, obtained as described in Example XX, were suspended in 15 cc. of methanol, cooled to 0° C. and treated, under a nitrogen atmosphere, with 1.2 cc. of methanol containing 60 mg. of potassium hydroxide. The mixture was stirred at 0° C. under nitrogen for 1 hour (a clear solution is obtained within 15 minutes), neutralized with acetic acid and poured into cold saturated sodium chloride solution. The precipitate was collected, washed well with water and dried. The aqueous solution was extracted with methylene chloride, washed with water, dried over sodium sulfate and evaporated to dryness. Crystallization of the combined products from acetone-ether gave 6-monofluoromethyl - 16α - methyl-$\Delta^{4,6}$-pregnadien-17α,21-diol-3,20-dione.

By following the method of Example XXI, the above compound was converted into its 21-tosylate, 6α-monofluoromethyl - 16α-methyl-$\Delta^{4,6}$-pregnadien-17α-ol-3,20-dione and 6α - monofluoromethyl - 16α-methyl-$\Delta^{4,6}$-pregnadien-17α-ol-3,20-dione acetate.

*Example XLI*

By following the method of Example XXVI, 5 g. of 16α-methyl-$\Delta^4$-pregnen-21-ol-3,20-dione described by V. Petrow et al., in J. Chem. Soc., 1959, 3595, was converted into 3,20 - bisethylenedioxy-16α-methyl-$\Delta^5$-pregnen-21-ol; 5α,6α-oxido-3,20-bisethylenedioxy - 16α - methyl-pregnan-21-ol; 6β-trifluoromethyl-3,20-bisethylenedioxy-16α-methylpregnane - 5α,21-diol; 6α-trifluoromethyl-16α-methyl-$\Delta^4$-pregnen - 21 - ol - 3,20-dione and 6α-trifluoromethyl-16α-methyl-$\Delta^4$-pregnen-21-ol-3,20-dione acetate.

Upon treatment of the latter compound with chloranil in mixture with ethyl acetate and acetic acid, in accordance with the method of Example XIII, there was obtained 6-trifluoromethyl - 16α - methyl-$\Delta^{4,6}$-pregnadien-21-ol-3,20-dione acetate.

We claim:

1. A compound of the following formula:

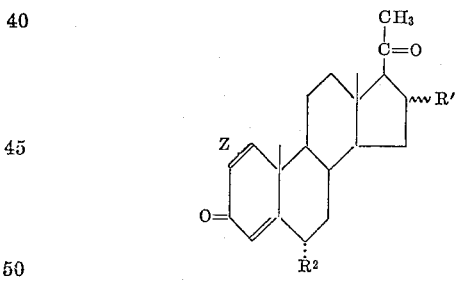

wherein R' is selected from the group consisting of hydrogen, α-methyl and β-methyl; $R^2$ is selected from the group consisting of a monofluoromethyl, difluoromethyl and a trifluoromethyl group and Z is selected from the group consisting of a double bond between C–1 and C–2 and a saturated linkage between C–1 and C–2.

2. A compound of the following formula:

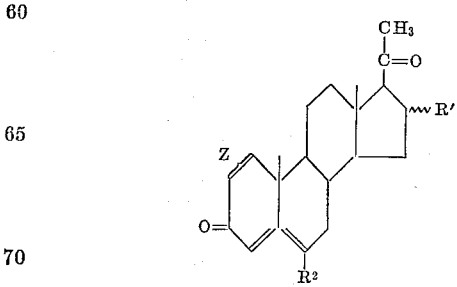

wherein R' is selected from the group consisting of hydrogen, α-methyl and β-methyl; $R^2$ is selected from the group consisting of a monofluoromethyl, difluoromethyl and a trifluoromethyl group and Z is selected from the group consisting of a double bond between C–1 and C–2 and a saturated linkage between C–1 and C–2.

3. A compound of the following formula:

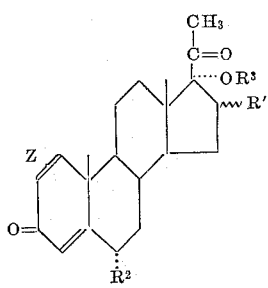

wherein R' is selected from the group consisting of hydrogen, α-methyl and β-methyl; $R^2$ is selected from the group consisting of monofluoromethyl, difluoromethyl and a trifluoromethyl group; $R^3$ is selected from the group consisting of hydrogen and a hydrocarbon carboxylic acyl group of less than 12 carbon atoms; and Z is selected from the group consisting of a double bond between C–1 and C–2 and a saturated linkage between C–1 and C–2.

4. 6α - monofluoromethyl - 17α - acetoxy-progesterone.
5. 6α - difluoromethyl - 17α - acetoxy - progesterone.
6. 6α - trifluoromethyl - 16α - methyl - 17α - acetoxy-progesterone.

7. A compound of the following formula:

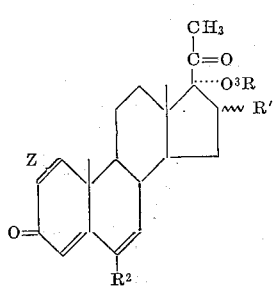

wherein R' is selected from the group consisting of hydrogen, α-methyl, and β-methyl; $R^2$ is selected from the group consisting of monofluoromethyl, difluoromethyl and a trifluoromethyl group; $R^3$ is selected from the group consisting of hydrogen and a hydrocarbon carboxylic acyl group of less than 12 carbon atoms; and Z is selected from the group consisting of a double bond between C–1 and C–2 and a saturated linkage between C–1 and C–2.

8. 6α - monofluoromethyl - $\Delta^{4,6}$ - pregnadien - 17α - ol-3,20-dione acetate.
9. 6 - monofluoromethyl - 16α -methyl - $\Delta^{4,6}$ - pregnadien - 17α - ol - 3,20 - dione acetate.
10. 6 - difluoromethyl - $\Delta^{1,4,6}$ - pregnatrien - 17α - ol-3,20-dione acetate.
11. 6 - difluoromethyl - 16α - methyl - $\Delta^{4,6}$ - pregnadien-17α-ol-3,20-dione acetate.
12. 6 - difluoromethyl - 16β - methyl - $\Delta^{1,4,6}$ - pregnatrien-17α-ol-3,20-dione acetate.
13. 6 - trifluoromethyl - $\Delta^{4,6}$ - pregnadien - 17α - ol-3,20-dione acetate.
14. 6-trifluoromethyl - 16α - methyl - $\Delta^{4,6}$ - pregnadien-17α-ol-3,20-dione acetate.

15. A compound of the following formula:

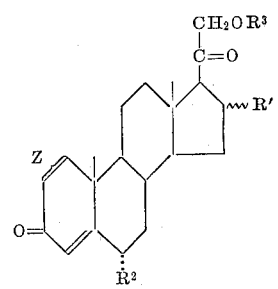

wherein R' is selected from the group consisting of hydrogen, α-methyl and β-methyl; $R^2$ is selected from the group consisting of a mnoofluoromethyl, difluoromethyl and a trifluoromethyl group; $R^3$ is selected from the group consisting of hydrogen and a hydrocarbon carboxylic acyl group of less than 12 carbon atoms; and Z is selected from the group consisting of a double bond between C–1 and C–2 and a saturated linkage between C–1 and C–2.

16. A compound of the following formula:

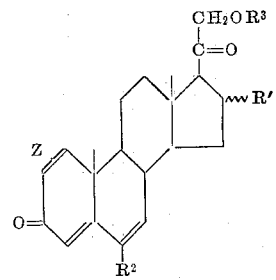

wherein R' is selected from the group consisting of hydrogen, α-methyl and β-methyl; $R^2$ is selected from the group consisting of a monofluoromethyl, difluoromethyl and a trifluoromethyl group; $R^3$ is selected from the group consisting of hydrogen and a hydrocarbon carboxylic acyl group of less than 12 carbon atoms; and Z is selected from the group consisting of a double bond between C–1 and C–2 and a saturated linkage between C–1 and C–2.

17. A compound of the following formula:

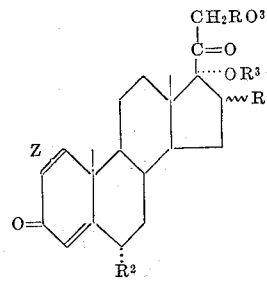

wherein R' is selected from the group consisting of hydrogen, α-methyl and β-methyl; $R^2$ is selected from the group consisting of a monofluoromethyl, difluoromethyl and a trifluoromethyl group; $R^3$ is selected from the group consisting of a hydrogen and a hydrocarbon carboxylic acyl group of less than 12 carbon atoms; and Z is selected from the group consisting of a double bond between C–1 and C–2 and a saturated linkage between C–2 and C–2.

18. A compound of the following formula:

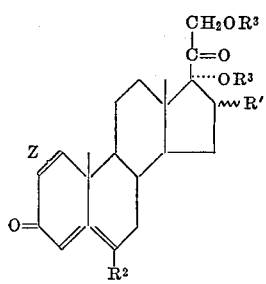

wherein R' is selected from the group consisting of hydrogen, α-methyl and β-methyl; $R^2$ is selected from the group consisting of a monofluoromethyl, difluoromethyl and a trifluoromethyl group; $R^3$ is selected from the group consisting of a hydrogen and a hydrocarbon carboxylic acyl group of less than 12 carbon atoms; and Z is selected from the group consisting of a double bond between C–1 and C–2 and at saturated linkage between C–1 and C–2.

19. A compound of the following formula:

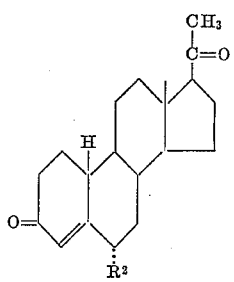

wherein $R^2$ is selected from the group consisting of a monofluoromethyl, difluoromethyl and a trifluoromethyl group.

20. A compound of the following formula:

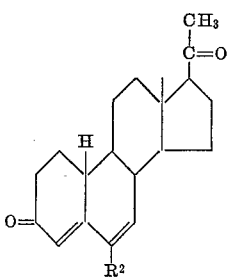

wherein $R^2$ is selected from the group consisting of a monofluoromethyl, difluoromethyl and a trifluoromethyl group.

21. A compound of the following formula:

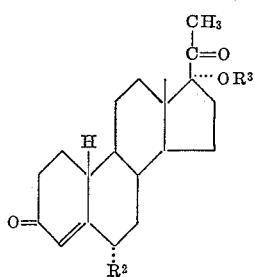

wherein $R^2$ is selected from the group consisting of a monofluoromethyl, difluoromethyl and a trifluoromethyl group; and $R^3$ is selected from the group consisting of hydrogen and a hydrocarbon carboxylic acyl group of less than 12 carbon atoms.

22. 6α - monofluoromethyl-19-nor-17α-acetoxy-progesterone.

23. A compound of the following formula:

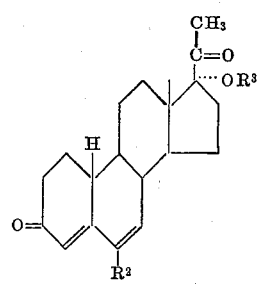

wherein $R^2$ is selected from the group consisting of a monofluoromethyl, difluoromethyl and a trifluoromethyl group; and $R^3$ is selected from the group consisting of hydrogen and a hydrocarbon carboxylic acyl group of less than 12 carbon atoms.

24. 6 - monofluoromethyl - 19-nor-$\Delta^{4,6}$-pregnadien-17α-ol-3,20-dione acetate.

25. A compound of the following formula:

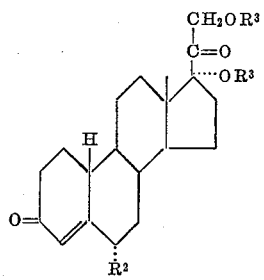

wherein $R^2$ is selected from the group consisting of a monofluoromethyl, difluoromethyl and a trifluoromethyl group; and $R^3$ is selected from the group consisting of hydrogen and a hydrocarbon carboxylic acyl group of less than 12 carbon atoms.

26. A compound of the following formula:

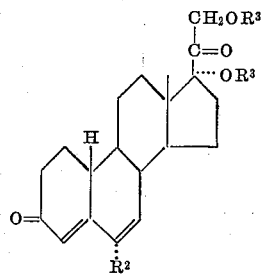

wherein $R^2$ is selected from the group consisting of a monofluoromethyl, difluoromethyl and a trifluoromethyl group; and $R^3$ is selected from the group consisting of hydrogen and a hydrocarbon carboxylic acyl group of less than 12 carbon atoms.

27. A compound of the following formula:

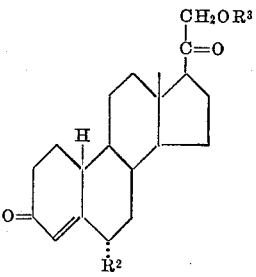

wherein R² is selected from the group consisting of a monofluoromethyl, difluoromethyl and a trifluoromethyl group; and R³ is selected from the group consisting of hydrogen and a hydrocarbon carboxylic acyl group of less than 12 carbon atoms.

28. A compound of the following formula:

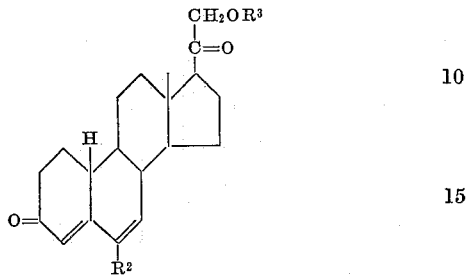

wherein R² is selected from the group consisting of a monofluoromethyl, difluoromethyl and a trifluoromethyl group; and R³ is selected from the group consisting of hydrogen and a hydrocarbon carboxylic acyl group of less than 12 carbon atoms.

29. In the process of producing a 6α-difluoromethyl derivative of the pregnane series, the step comprising reacting a 6α-carboxaldehyde derivative of the pregnane series with sulfur tetrafluoride.

30. In the process of producing a 6α-trifluoromethyl derivative of the pregnane series, the steps comprising oxidizing a 6α-carboxaldehyde derivative of the pregnane series to form the corresponding 6α-carboxylic acid derivative and thereafter reacting with sulfur tetrafluoride.

31. In the process of producing a 6α-monofluoromethyl derivative of the pregnane series, the steps comprising reducing a 6α-carboxaldehyde derivative of the pregnane series to form the corresponding 6α-methylol derivative, reacting the latter derivative with mesyl chloride and thereafter with an alkali metal fluoride.

32. A compound selected from the group consisting of those having the formula:

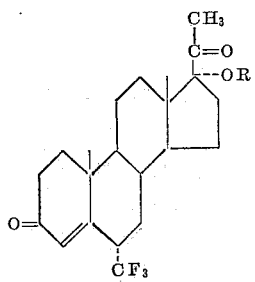

wherein R is selected from the group consisting of hydrogen and lower alkanoyl; and the 1-dehydro, 6-dehydro, and 1,6-bisdehydro derivatives thereof.

33. A member selected from the group consisting of a compound of the formula:

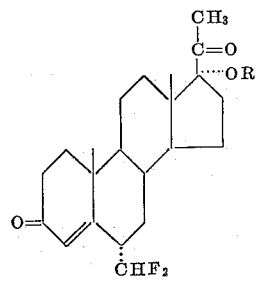

where R is selected from the group consisting of hydrogen and lower alkanoyl; and the 1-dehydro, 6-dehydro, and 1,6-bisdehydro derivatives thereof.

34. A member selected from the group consisting of a compound of the formula

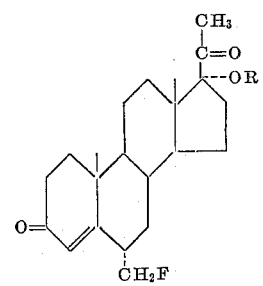

wherein R is selected from the group consisting of hydrogen and lower alkanoyl; and the 1-dehydro, 6-dehydro and 1,6-bisdehydro derivatives thereof.

References Cited

UNITED STATES PATENTS

| | | | |
|---|---|---|---|
| 2,838,495 | 6/1958 | Campbell et al. | 260—239.55 |
| 2,838,498 | 6/1958 | Magerlein et al. | 260—239.55 |
| 2,878,268 | 3/1959 | Campbell et al. | 260—397.3 |
| 2,960,436 | 11/1960 | Thoma et al. | 195—51 |

LEWIS GOTTS, *Primary Examiner.*

LESLIE H. GASTON, *Examiner.*

R. E. WEXLER, E. L. ROBERTS, *Assistant Examiners.*